(12) United States Patent
Haruta

(10) Patent No.: US 9,692,940 B2
(45) Date of Patent: Jun. 27, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenichirou Haruta, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/822,095

(22) Filed: Aug. 10, 2015

(65) Prior Publication Data

US 2016/0057312 A1 Feb. 25, 2016

(30) Foreign Application Priority Data

Aug. 20, 2014 (JP) .................. 2014-167978

(51) Int. Cl.
H04N 1/04 (2006.01)
H04N 1/409 (2006.01)
H04N 1/405 (2006.01)

(52) U.S. Cl.
CPC ........... *H04N 1/4092* (2013.01); *H04N 1/405* (2013.01)

(58) Field of Classification Search
CPC .............. H04N 1/407; H04N 1/00352; H04N 1/00384; H04N 1/00397; H04N 1/00411; H04N 1/00416; H04N 1/00432; H04N 1/00474; H04N 1/00482; H04N 1/387; H04N 1/3873; H04N 1/405; H04N 1/409; H04N 1/4092
USPC ........ 358/1.9, 3.26, 2.1, 1.2, 3.03, 3.06, 3.1, 358/3.13, 3.14, 3.15, 3.27, 504, 515, 518; 348/220.1, 239, E5.024, 189, E13.074, 348/E17.001, E3.048, E5.051, E7.085, 348/148, 207.1, 222.1, 46, 745; 382/100, 382/128, 173, 279, 106, 112, 130, 131, 382/132, 137, 154, 162, 167, 181; 399/1
See application file for complete search history.

(56) References Cited

U.S. PATENT DOCUMENTS

| | | | | |
|---|---|---|---|---|
| 5,937,232 A | * | 8/1999 | Taguchi ............. | H04N 1/00352 399/182 |
| 6,934,057 B1 | * | 8/2005 | Namizuka .............. | H04N 1/407 358/2.1 |
| 7,486,414 B2 | * | 2/2009 | Arai ................... | G03G 15/5062 358/1.9 |
| 7,706,021 B2 | | 4/2010 | Kaburagi | |
| 8,687,240 B2 | * | 4/2014 | Fukamachi ............ | H04N 1/405 347/131 |
| 8,837,838 B2 | * | 9/2014 | Washio ................ | G06K 9/4604 382/199 |
| 9,025,206 B2 | * | 5/2015 | Ikari ..................... | H04N 1/405 358/1.16 |

(Continued)

FOREIGN PATENT DOCUMENTS

JP 2006-295877 A 10/2006

*Primary Examiner* — Negussie Worku
(74) *Attorney, Agent, or Firm* — Fitzpatrick, Cella, Harper & Scinto

(57) ABSTRACT

Jaggies in an edge portion are reduced while suppressing deterioration of an image to a minimum. There are provided a determination unit configured to determine an edge of an object from input image data, a unit configured to generate edge correction data used to correct a pixel value of a pixel constituting the edge, a screen data generation unit configured to generate screen data by performing screen processing on the input image dada, and an image combination unit configured to generate output image in which a screen dot existing in the edge in the screen data is shifted into the inside of the object.

19 Claims, 27 Drawing Sheets

(56) References Cited

U.S. PATENT DOCUMENTS

| | | | | |
|---|---|---|---|---|
| 9,247,105 B2* | 1/2016 | Kashibuchi | .......... | H04N 1/4092 |
| 2004/0165200 A1* | 8/2004 | Nabeshima | ........ | G06K 9/00463 |
| | | | | 358/1.9 |
| 2005/0083552 A1* | 4/2005 | Kaburagi | ............. | H04N 1/4092 |
| | | | | 358/2.1 |
| 2005/0117926 A1* | 6/2005 | Tanaka | ............... | G03G 15/0126 |
| | | | | 399/49 |
| 2009/0067007 A1* | 3/2009 | Ishida | ...................... | H04N 1/60 |
| | | | | 358/3.23 |
| 2010/0014116 A1* | 1/2010 | Haruta | .................... | B41J 2/471 |
| | | | | 358/1.15 |
| 2011/0032406 A1* | 2/2011 | Kim | .................. | H04N 1/00352 |
| | | | | 348/333.01 |
| 2012/0147430 A1* | 6/2012 | Kashibuchi | .......... | H04N 1/4092 |
| | | | | 358/3.27 |
| 2012/0274989 A1* | 11/2012 | Haruta | .................. | H04N 1/506 |
| | | | | 358/448 |
| 2013/0242055 A1* | 9/2013 | Choo | ................. | H04N 13/0253 |
| | | | | 348/46 |
| 2014/0168672 A1* | 6/2014 | Haruta | .................... | H04N 1/58 |
| | | | | 358/1.9 |
| 2015/0015918 A1* | 1/2015 | Eguchi | ............... | G06K 15/1872 |
| | | | | 358/3.27 |
| 2015/0181076 A1* | 6/2015 | Mita | ...................... | H04N 1/401 |
| | | | | 358/1.2 |
| 2015/0220034 A1* | 8/2015 | Haruta | ................ | G03G 15/556 |
| | | | | 399/27 |
| 2016/0057312 A1* | 2/2016 | Haruta | ................ | H04N 1/4092 |
| | | | | 358/474 |
| 2016/0266512 A1* | 9/2016 | Haruta | ................ | G03G 15/043 |

* cited by examiner

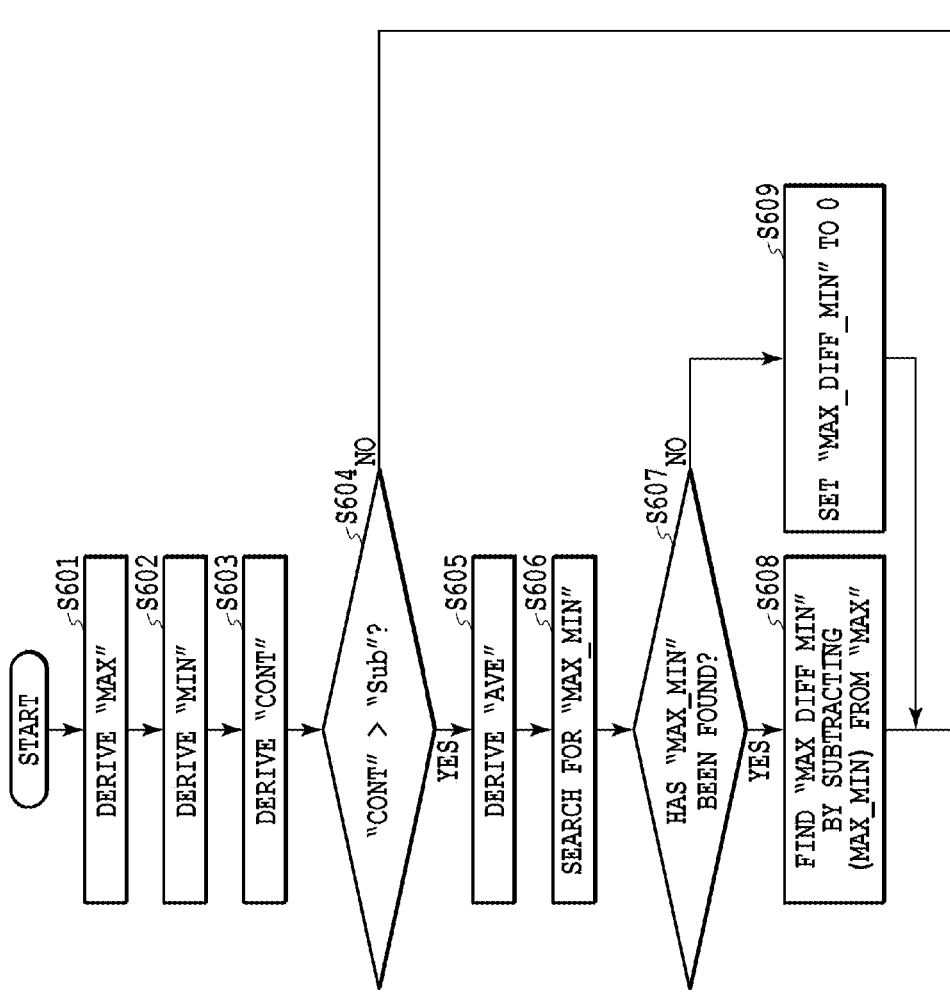

| INPUT VALUE | OUTPUT VALUE |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |

FIG.11A

| INPUT VALUE | OUTPUT VALUE |
|---|---|
| 0 | 0 |
| 1 | 1 |
| 2 | 1 |
| 3 | 1 |
| 4 | 2 |
| 5 | 2 |
| 6 | 3 |
| 7 | 3 |
| 8 | 3 |
| 9 | 4 |
| 10 | 5 |
| 11 | 6 |
| 12 | 7 |
| 13 | 9 |
| 14 | 11 |
| 15 | 15 |

FIG.11B

| INPUT VALUE | OUTPUT VALUE |
|---|---|
| 0 | 0 |
| 1 | 3 |
| 2 | 5 |
| 3 | 7 |
| 4 | 8 |
| 5 | 9 |
| 6 | 10 |
| 7 | 11 |
| 8 | 12 |
| 9 | 12 |
| 10 | 13 |
| 11 | 13 |
| 12 | 14 |
| 13 | 14 |
| 14 | 15 |
| 15 | 15 |

FIG.11C

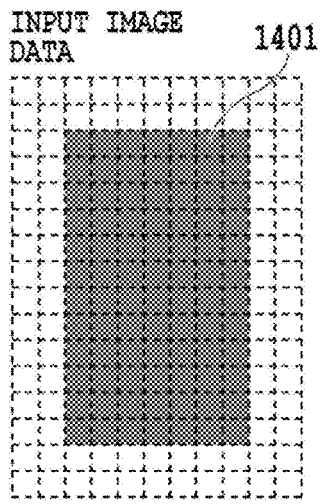
FIG.14A INPUT IMAGE DATA 1401
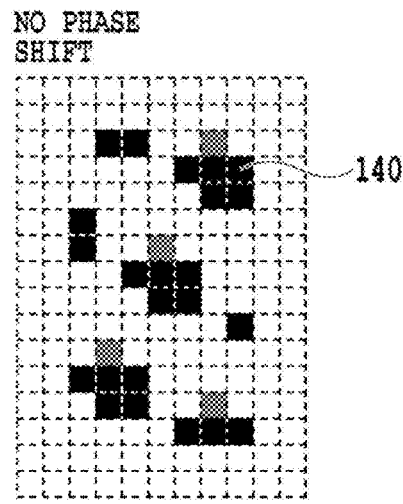
FIG.14B NO PHASE SHIFT 1402
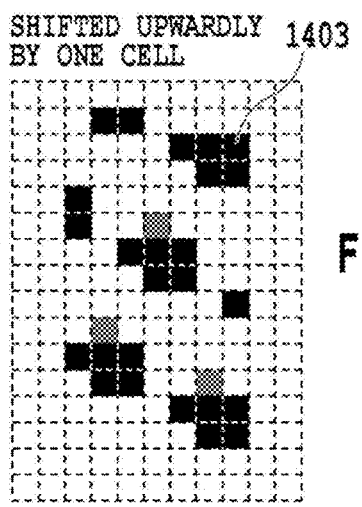
FIG.14C SHIFTED UPWARDLY BY ONE CELL 1403
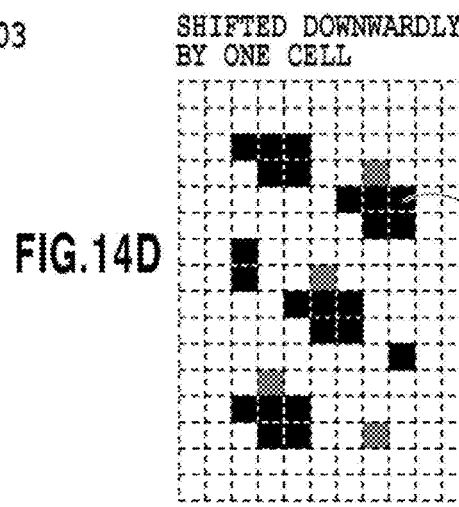
FIG.14D SHIFTED DOWNWARDLY BY ONE CELL 1404
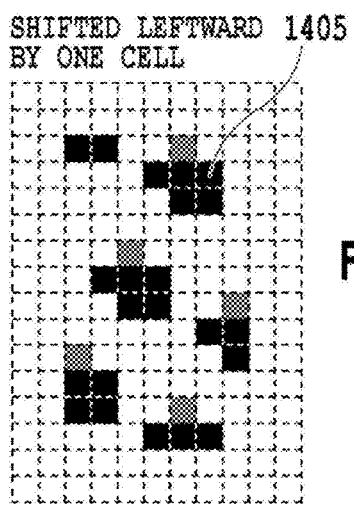
FIG.14E SHIFTED LEFTWARD BY ONE CELL 1405
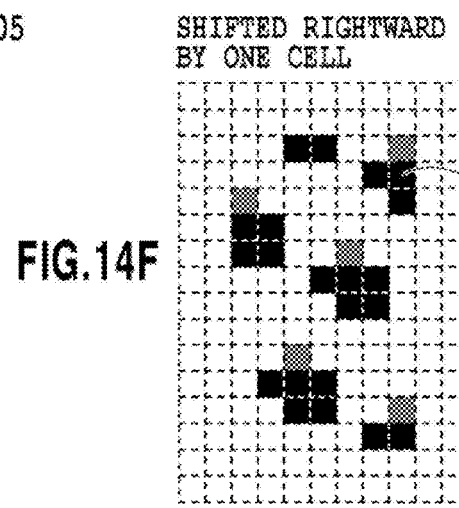
FIG.14F SHIFTED RIGHTWARD BY ONE CELL 1406

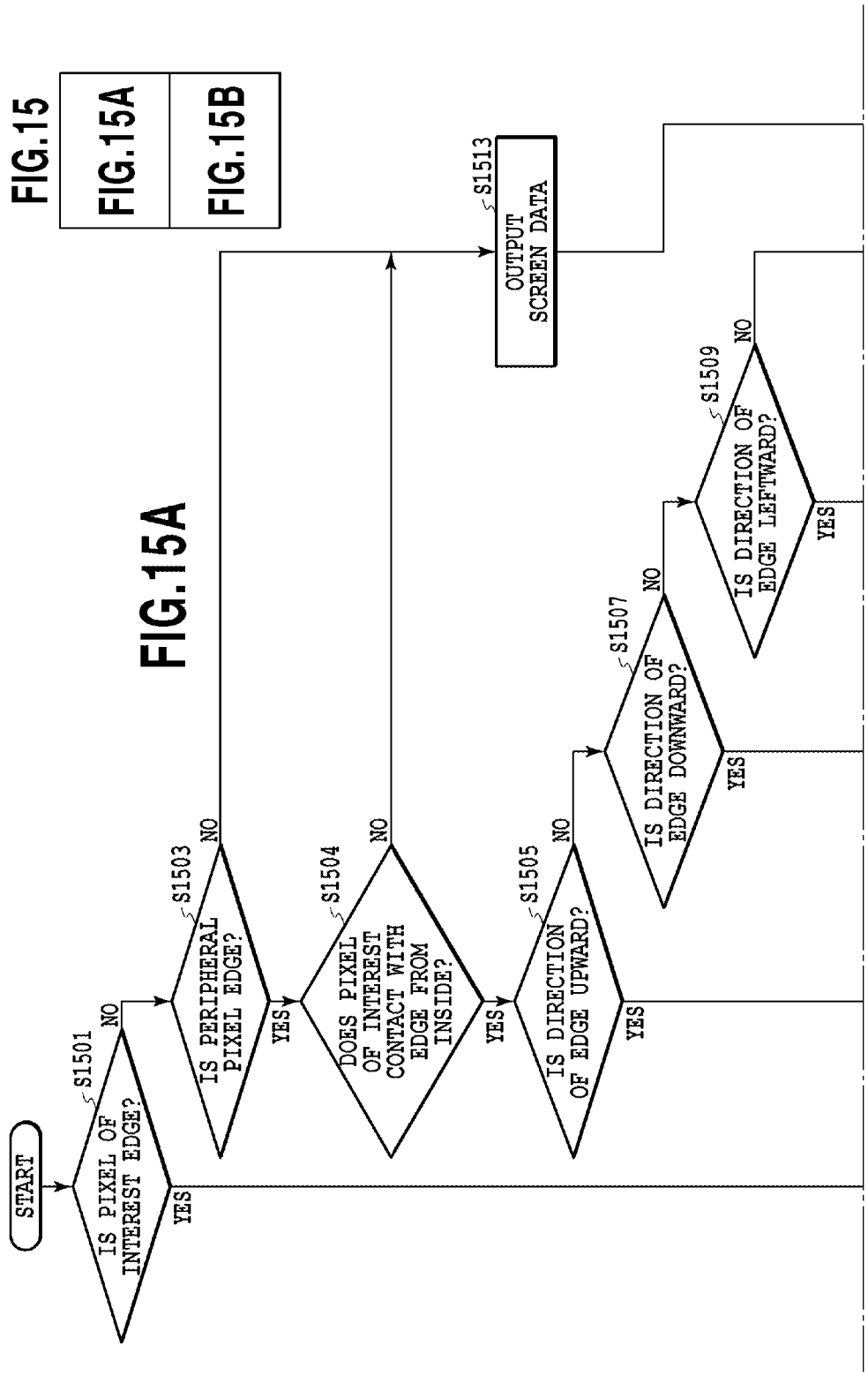

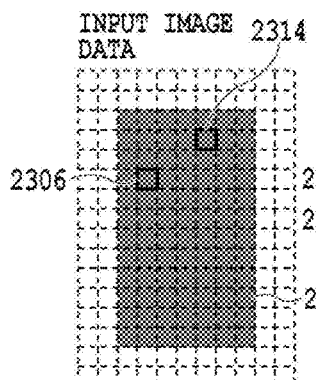
FIG.23A INPUT IMAGE DATA
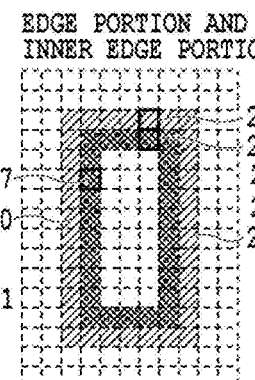
FIG.23B EDGE PORTION AND INNER EDGE PORTION
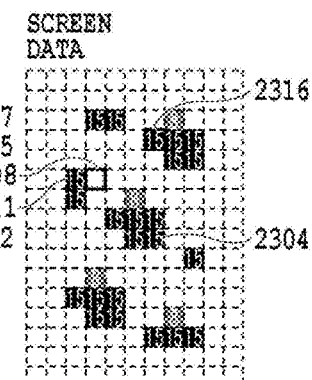
FIG.23C SCREEN DATA
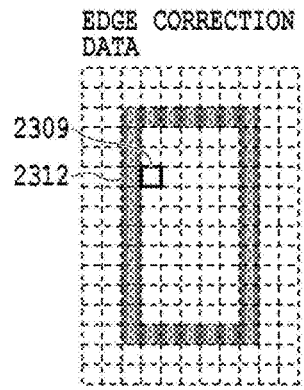
FIG.23D EDGE CORRECTION DATA
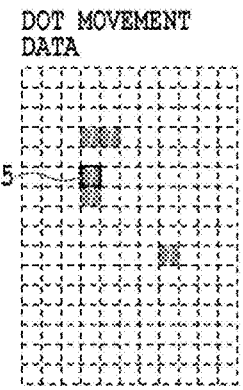
FIG.23E DOT MOVEMENT DATA
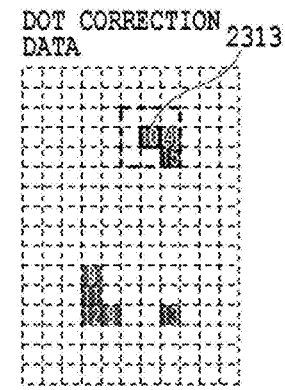
FIG.23F DOT CORRECTION DATA
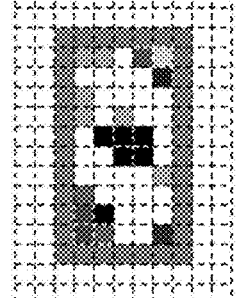
FIG.23G RESULTS OF EDGE CORRECTION PROCESSING OF SECOND EMBODIMENT

IMAGE PROCESSING APPARATUS, IMAGE PROCESSING METHOD, AND STORAGE MEDIUM

BACKGROUND OF THE INVENTION

Field of the Invention

The present invention relates to a technique to reduce jaggies in an edge portion in image data.

Description of the Related Art

Conventionally, in an image forming apparatus, several techniques to reduce ruggedness called jaggies, which occurs in the edge portion of a character or the like, have been proposed. There are a variety of reasons for the occurrence of jaggies, but it can be thought that the main reason is ruggedness of pixels caused by a low-resolution printer and ruggedness accompanying screen processing.

As a technique to improve ruggedness accompanying screen processing, for example, there is a technique to generate corrected data from the image data before screen processing and to add the corrected data to the edge portion of the image data after the screen processing so that the edge portion is rimmed therewith (e.g., see Japanese Patent Laid-Open No. 2006-295877). In this technique, whether or not the edge portion is an edge portion on which edge correction processing should be performed is determined and in the case where the edge portion is an edge portion that needs edge correction processing, the corrected data and image data after the screen processing are compared, and then the data whose value is greater is output, and thereby, jaggies caused by the screen processing are reduced. Further, with this technique, the ruggedness of pixels caused by a low-resolution printer, which is described earlier, is also reduced at the same time even though the configuration is simple.

The method of Japanese Patent Laid-Open No. 2006-295877 is a method in which the corrected data consisting mainly of half dots and the image data after the screen processing consisting mainly of full dots are combined and then output to the edge portion. Because of this, the edge portion consists of different dots, i.e., half dots and full dots, and there is a case where a half dot is absorbed by a nearby full dot, and therefore, the degree in reduction in jaggies in the edge portion is small. The reason is that toner is pulled to a deeper position of a latent image in the position where a shallow latent image of the corrected data neighbors a deep latent image of the image data after the screen processing at the time of development in the case of the electrophotographic scheme. As a result of this, development is hard to progress in the shallow latent image portion, and therefore, there is a case where the degree in reduction in jaggies in the edge portion is small.

SUMMARY OF THE INVENTION

An image processing apparatus according to the present invention includes a determination unit configured to determine an edge of an object from input image data, a unit configured to generate edge correction data used to correct the pixel value of a pixel constituting the edge, a screen data generation unit configured to generate screen data by performing screen processing on the input image data, and an image combination unit configured to generate output image data in which a screen dot existing in the edge in the screen data is shifted into the inside of the object.

Further features of the present invention will become apparent from the following description of exemplary embodiments (with reference to the attached drawings).

BRIEF DESCRIPTION OF THE DRAWINGS

FIGS. 11A, 11B, and 11C show examples of a lookup table that is used in edge correction data generation processing;

FIGS. 14A to 14F are diagrams explaining screen processing results of the screen processing unit and screen processing results of a phase-shifted screen processing unit by comparison;

FIGS. 23A to 23G are diagrams explaining examples of the case where edge correction processing is performed by using the second embodiment;

DESCRIPTION OF THE EMBODIMENTS

Hereinafter, aspects for embodying the present invention are explained by using the drawings. Configurations shown in the following embodiments are merely exemplary and the present invention is not limited to the configurations shown schematically.

[First Embodiment]

In the present embodiment, explanation is given by taking an example of a digital multi function peripheral (hereinafter, MFP) adopting an electrophotographic scheme, which has a plurality of functions as a copying machine, a printer, a facsimile, etc., as an image forming apparatus. However, it is possible to apply the present embodiment to an apparatus that uses another process, such as an apparatus adopting, for example, an ink jet scheme, not limited to the above.

Figure 1:
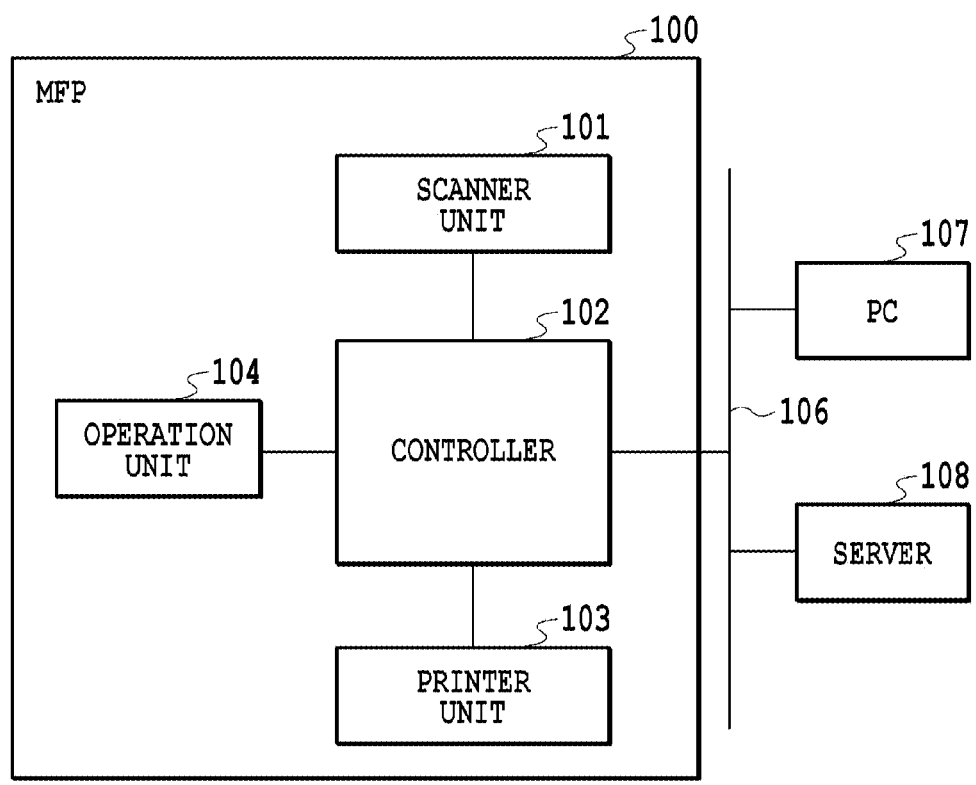
FIG. 1 is an outline block diagram showing a configuration of an MFP according to a first embodiment.

FIG. 1 is an outline block diagram showing a configuration of an MFP 100 according to the present embodiment. The MFP 100 includes a scanner unit 101, a controller 102, a printer unit 103, and an operation unit 104.

The scanner unit 101 optically reads an image of a document and acquires the image as image data.

The controller 102 includes a CPU, a ROM, and a RAM and performs predetermined image processing on image data or the like read by the scanner unit 101. The image data on which the image processing has been performed is stored in the RAM within the controller 102.

The printer unit 103 forms an image on a printing sheet by the electrophotographic scheme in accordance with printing setting conditions specified for the image data on which the image processing has been performed. It is assumed that the printer 103 of the present embodiment can adjust the exposure amount of laser by PWM and image data having a 4-bit value for each pixel is input.

The operation unit 104 is a user interface for a user to perform various operations. A user performs settings or the like of various printing conditions for the image data to be printed via the operation unit 104.

To the MFP 100, a server 108 that manages image data, a personal computer (PC) 107 that instructs the MFP 100 to perform printing, etc., are connected via a network 106. In the case where the controller 102 is instructed to perform printing by the server 108 or the PC 107, the controller 102 rasterizes image data transmitted from the server 108 or the PC 107, converts the image data into image data (bitmap data) compatible with the printer unit 103, and stores the image data in the RAM.

Figure 2:
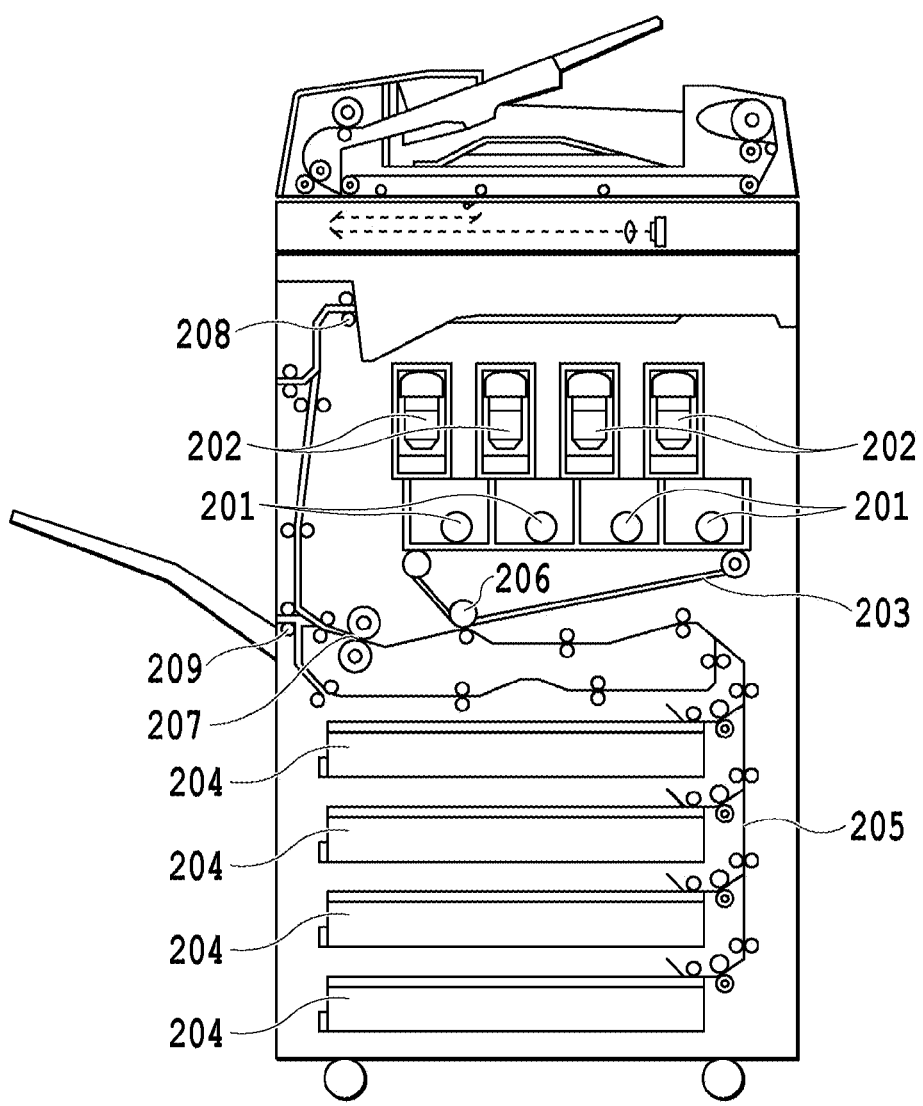
FIG. 2 is a diagram showing details of a printer unit.

FIG. 2 is a diagram showing details of the printer unit 103, showing a mechanism of a four-color drum for forming an image on a printing medium by the electrophotographic scheme.

Bitmap data and attribute data stored temporarily in the RAM within the controller 102 are transmitted to the printer unit 103 after image processing for printing, to be described later, is performed again within the controller 102. In the printer unit 103, the data is converted into a pulse signal by the PWM control within the printer unit 103 and converted into irradiation laser light in four colors, i.e., cyan (C), magenta (M), yellow (Y), and black (K) in a laser irradiation unit. Then, a photoconductor 201 of each color is irradiated with the irradiation laser light, and thereby, an electrostatic latent image is formed on each photoconductor.

The printer unit 103 performs toner development on each photoconductor by using toner supplied from a toner cartridge 202, and a toner image made visual on each photoconductor is primarily transferred to an intermediate transfer belt 203. The intermediate transfer belt 203 rotates in the clockwise direction in FIG. 2 and at the time of the printing sheet supplied and sent from a sheet cassette 204 through a sheet feed conveyance path 205 reaching a secondary transfer position 206, the toner image is transferred from the intermediate transfer belt 203 onto the printing sheet. On the printing sheet onto which the image is transferred, the toner fixes in a fixing unit 207 due to applied pressure and heat, and after the printing sheet is conveyed through the sheet discharge conveyance path, it is discharged to a face-down center tray 208 or face-up side tray 209.

Figure 3:
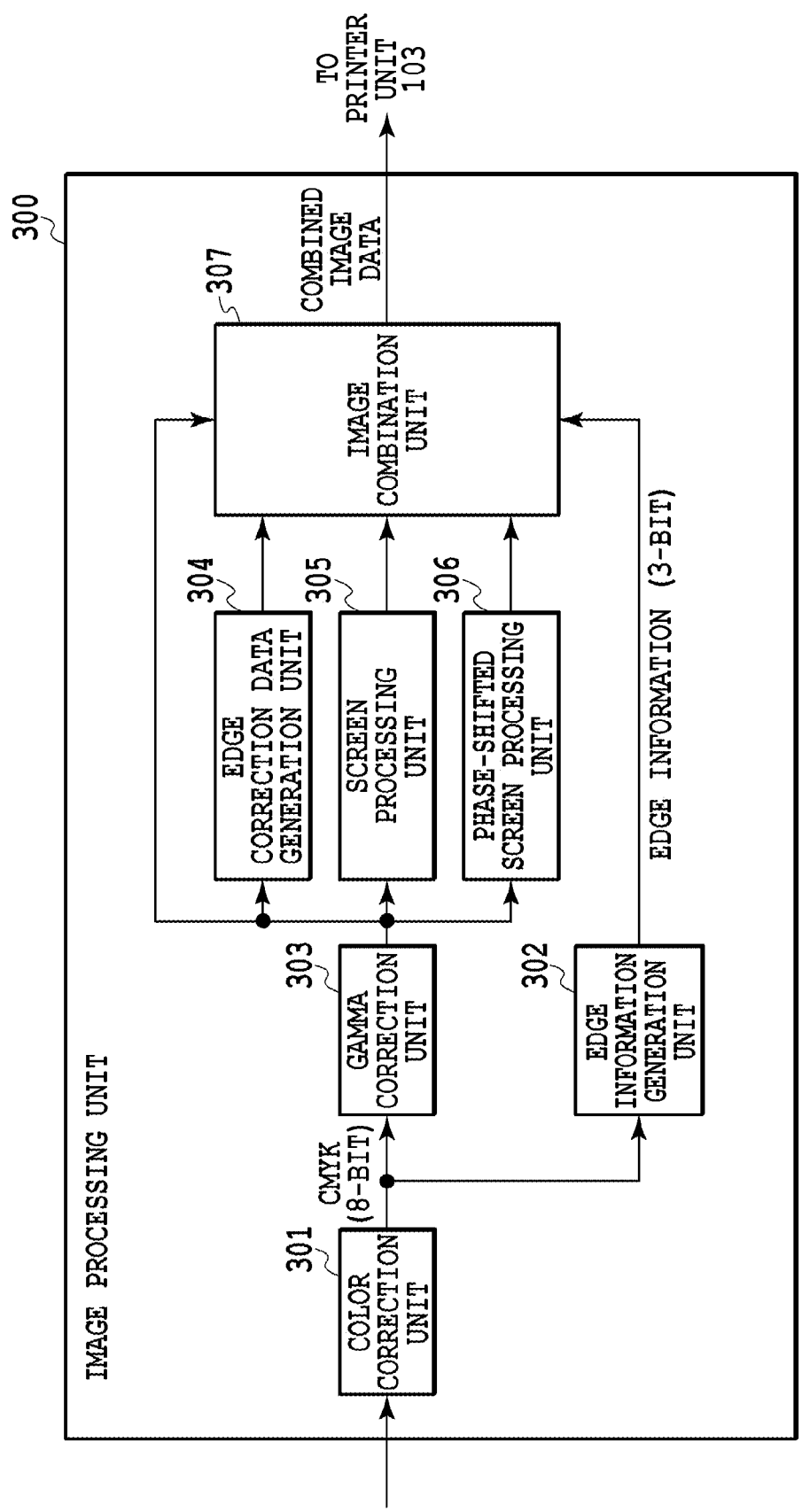
FIG. 3 is a block diagram showing an internal configuration of an image processing unit according to the first embodiment.

Next, image processing for printing that is performed within the controller 102 is explained. FIG. 3 is a block diagram showing an internal configuration of an image processing unit as a function unit that performs image processing. Each piece of the processing in an image processing unit 300, to be described below, is implemented by the CPU within the controller 102 executing control programs held in the ROM after developing the programs onto the RAM. The image processing unit 300 according to the present embodiment includes a color correction unit 301, an edge information generation unit 302, a gamma correction unit 303, an edge correction data generation unit 304, a screen processing unit 305, a phase-shifted screen processing unit 306, and an image combination unit 307.

The color correction unit 301 performs color correction processing on image data (bitmap data) acquired from the RAM within the controller 102. Specifically, the color correction unit 301 converts the image data into image data in the CMYK color space in which the density is represented by four kinds of colors of CMYK (image signal) by using a color conversion LUT or by performing a matrix calculation. The converted image data has an 8-bit (0 to 255) value for each pixel in each color.

The edge information generation unit 302 generates edge information for each color of CMYK. The edge information is data having a 3-bit value for each pixel. The high-order one bit indicates whether or not the pixel is a pixel constituting an edge (hereinafter, an edge pixel) and in the case where the edge is an edge pixel, the bit is "1" and in the case where the pixel is a non-edge pixel, the bit is "0". The low-order two bits indicate the direction of an edge (edge direction): the upward direction is represented by "00", the downward direction by "01", the rightward direction by "10", and the leftward direction by "11". The generated edge information is referred to in the case where the image combination unit 307, to be described later, switches processing.

The gamma correction unit 303 performs processing (gamma correction processing) to correct the input CMYK image data by using a one-dimensional lookup table so that desired density characteristics will result in the case where an image is transferred onto a printing sheet. The image data on which gamma correction processing has been performed is sent to the edge correction data generation unit 304, the screen processing unit 305, the phase-shifted screen processing unit 306, and the image combination unit 307.

The edge correction data generation unit 304 generates correction data of an edge portion (hereinafter, edge correction data) from the input image data. The generated edge correction data is sent to the image combination unit 307.

The screen processing unit 305 generates screen data (halftone image data) by performing screen processing on the input image data. The generated screen data is sent to the image combination unit 307.

The phase-shifted screen processing unit 306 generates screen data in which the phase is shifted by using a dither matrix, which is the dither matrix used for the input image data by the screen processing unit 305 and in which the phase has been shifted. The generated phase-shifted screen data is sent to the image combination unit 307.

The image combination unit 307 performs image combination processing, to be described later, based on the edge information received from the edge information generation unit 302 and the image data after gamma correction.

<Edge Information Generation Processing>

Next, edge information generation processing in the edge information generation unit 302 is explained in detail with reference to FIG. 4 to FIG. 9.

Figure 4:
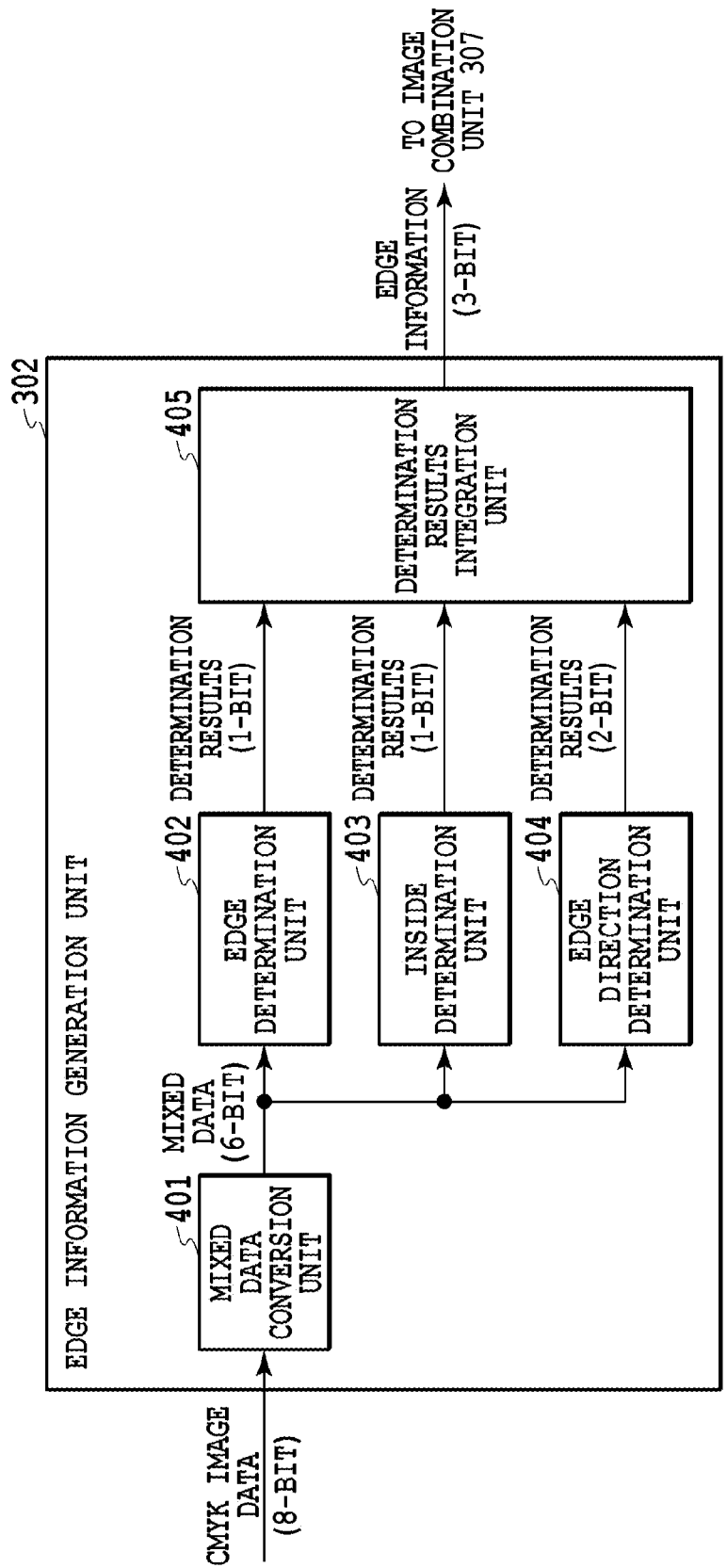
FIG. 4 is a block diagram showing an internal configuration of an edge information generation unit.

FIG. 4 is a block diagram showing an internal configuration of the edge information generation unit 302. The edge information generation unit 302 includes a mixed data conversion unit 401, an edge determination unit 402, an inside determination unit 403, an edge direction determination unit 404, and a determination results integration unit 405. In the case where image data having been converted into the CMYK color space is input to the edge information generation unit 302, the image data is sent to the mixed data conversion unit 401.

The mixed data conversion unit 401 generates data in which four colors of CMYK are mixed in arbitrary proportions (hereinafter, mixed data) by performing mixed data conversion processing on the input image data for each predetermined reference area (here, an area of 5×5 pixels) with the pixel of interest as a center. Each pixel within the image data has an 8-bit value, but in the subsequent processing, 8-bit data is not necessary, and therefore, in the present embodiment, the conversion processing is performed after rounding down the low-order two bits. Due to this, it is possible to reduce the circuit scale. Details of the mixed data conversion processing will be described later. The generated mixed data is sent to the edge determination unit 402, the inside determination unit 403, and the edge direction determination unit 404.

The edge determination unit 402 performs processing (edge determination processing) to determine whether or not the pixel of interest is an edge pixel to which the above-described edge correction data should be applied. Details of the edge determination processing will be described later. The results of the edge determination processing are sent to the determination results integration unit 405 as an edge determination signal (e.g., 1-bit signal that takes "1" in the case where the pixel of interest is an edge pixel and takes "0" in the case where the pixel of interest is a non-edge pixel).

The inside determination unit 403 performs processing (inside determination processing) to determine whether or not the pixel of interest is located inside. Specifically, the maximum value of the pixel values of the eight peripheral pixels of the pixel of interest is found and in the case where the pixel value of the pixel of interest is equal to or greater than the maximum value, it is determined that the pixel of interest is located inside. The results of the inside determination processing are sent to the determination results integration unit 405 as an inside determination signal (e.g., 1-bit signal that takes "1" in the case where the pixel of interest is located inside and takes "0" in the case where the pixel of interest is not located inside).

The edge direction determination unit 404 performs processing (edge direction determination processing) to determine the direction of an edge with the pixel of interest as a reference. Specifically, the pixel value of the pixel of interest is compared with the pixel value of the pixel located above, below, to the left, or to the right of the pixel of interest, and in the case where there is a difference therebetween, it is determined that an edge exists in that direction. The results of the edge direction determination processing are sent to the determination results integration unit 405 as an edge direction signal.

The determination results integration unit 405 generates the above-described edge information based on the edge determination signal, the inside determination signal, and the edge direction signal that are input. Specifically, as to the high-order one bit of the edge information, in the case where it is determined that the pixel of interest is an edge pixel in the edge determination processing and that the pixel of interest is located inside in the inside determination processing, "1" is set, and in other cases, "0" is set. Further, as to the low-order two bits of the edge information, the results of the edge direction determination processing are substituted for the low-order two bits as they are. In this manner, 3-bit edge information is generated for each pixel.

<Mixed Data Conversion Processing>

Details of mixed data conversion processing that is performed by the mixed data conversion unit 401 are explained.

Figure 5:
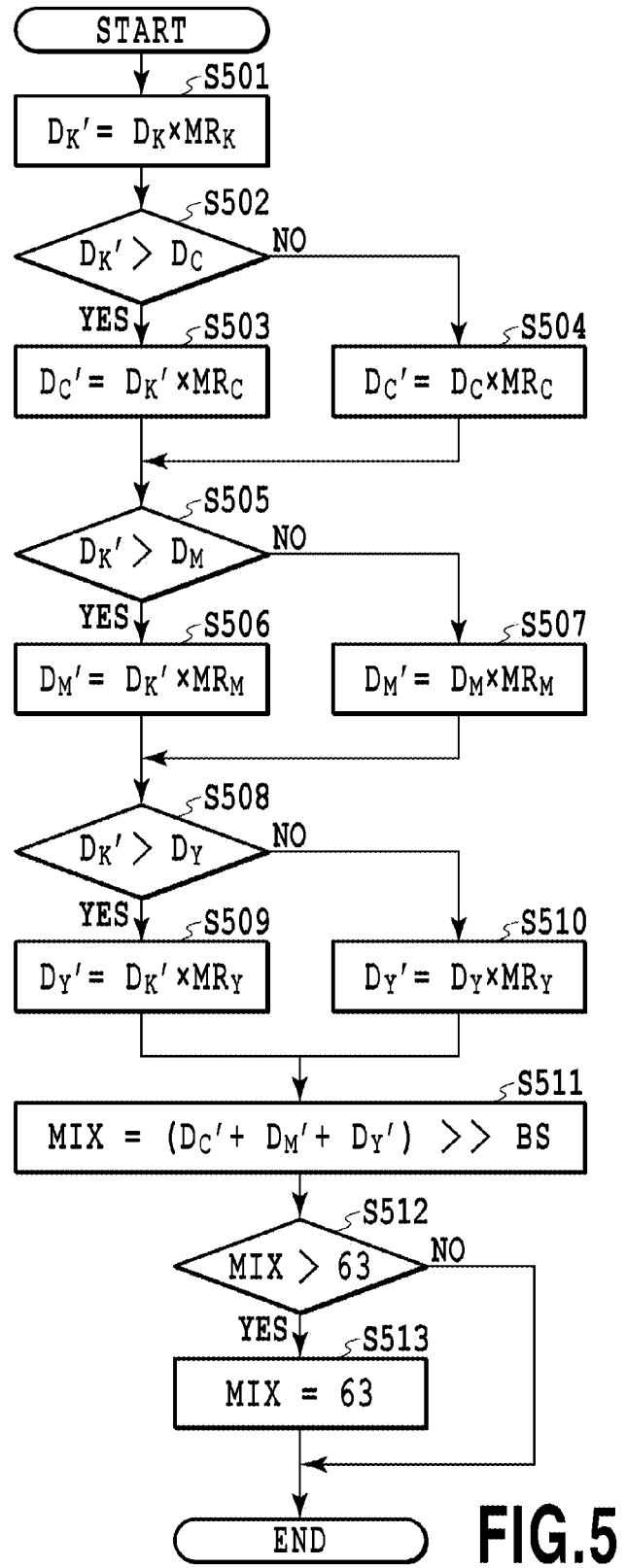
FIG. 5 is a flowchart showing a flow of mixed data conversion processing.

FIG. 5 is a flowchart showing a flow of the mixed data conversion processing. The mixed data conversion processing is performed on each pixel of all 25 pixels constituting the above-described reference area (area of 5×5 pixels) in the CMYK image data.

At step 501, the mixed data conversion unit 401 obtains a pixel value $D_K'$ of K by finding the product of a pixel value $D_K$ of K and a mixture ratio $MR_K$ of K. In this case, the mixture ratio $MR_K$ is a value that is set arbitrarily in a range between 0 and 15. Based on this, whether mixed data is generated only by chromatic colors of CMY or mixed data is generated by colors including the achromatic color K is determined.

At step 502, the mixed data conversion unit 401 determines whether the pixel value $D_K'$ of K obtained at step 501 is greater than a pixel value $D_C$ of C. In the case where the pixel value $D_K'$ is greater than the pixel value $D_C$, the processing proceeds to step 503. On the other hand, in the case where the pixel value $D_K'$ is not greater than the pixel value $D_C$, the processing proceeds to step 504.

At step 503, the mixed data conversion unit 401 obtains a pixel value $D_C'$ of C by finding the product of the pixel value $D_K'$ of K obtained at step 501 and a mixture ratio $MR_C$ of C. Here, the mixture ratio $MR_C$ is also a value that is set arbitrarily in the range between 0 and 15 like the mixture ratio $MR_K$ described above and by changing the value of the mixture ratio $MR_C$, it is possible to control the proportion of C for the mixed data to be generated.

At step 504, the mixed data conversion unit 401 obtains the pixel value $D_C'$ of C by finding the product of the pixel value $D_C$ of C and the above-described mixture ratio $MR_C$.

At step 505, the mixed data conversion unit 401 determines whether the pixel value $D_K'$ of K obtained at step 501 is greater than a pixel value $D_M$ of M. In the case where the pixel value $D_K'$ is greater than the pixel value $D_M$, the processing proceeds to step 506. On the other hand, in the case where the pixel value $D_K'$ is not greater than the pixel value $D_M$, the processing proceeds to step 507.

At step 506, the mixed data conversion unit 401 obtains a pixel value $D_M'$ of M by finding the product of the pixel value $D_K'$ of K obtained at step 501 and a mixture ratio $MR_M$ of M. Here, the mixture ratio $MR_M$ is also a value that is set arbitrarily in the range between 0 and 15 like the mixture ratio $MR_K$ described above and by changing the value of the mixture ratio $MR_M$, it is possible to control the proportion of M for the mixed data to be generated.

At step 507, the mixed data conversion unit 401 obtains the pixel value $D_M'$ of M by finding the product of the pixel value $D_M$ of M and the mixture ratio $MR_M$.

At step 508, the mixed data conversion unit 401 determines whether the pixel value $D_K'$ of K obtained at step 501 is greater than a pixel value $D_Y$ of Y. In the case where the pixel value $D_K'$ is greater than the pixel value $D_Y$, the processing proceeds to step 509. On the other hand, in the case where the pixel value $D_K'$ is not greater than the pixel value $D_Y$, the processing proceeds to step 510.

At step 509, the mixed data conversion unit 401 obtains a pixel value $D_Y'$ of Y by finding the product of the pixel value $D_K'$ of K obtained at step 501 and a mixture ratio $MR_Y$ of Y. Here, the mixture ratio $MR_Y$ is also a value that is set arbitrarily in the range between 0 and 15 like the mixture ratio $MR_K$ described above and by changing the mixture ratio $MR_Y$, it is possible to control the proportion of Y for the mixed data to be generated.

At step 510, the mixed data conversion unit 401 obtains the pixel value $D_Y'$ of Y by finding the product of the pixel value $D_Y$ of Y and the mixture ratio $MR_Y$.

At step 511, the mixed data conversion unit 401 finds the sum value of $D_C'$, $D_M'$ and $D_Y'$ obtained by the processing performed hitherto and finds mixed data [MIX] for each pixel by shifting the sum value that is found to the right by an amount corresponding to the number of bits specified by a bit shift amount BS.

At step 512, the mixed data conversion unit 401 determines whether the value of the mixed data [MIX] that is found at step 511 is greater than 63, which is the maximum value of the 6-bit values. In the case where the value of the mixed data [MIX] that is found at step 511 is greater than 63, the processing proceeds to step 513. On the other hand, in the case where the value of the mixed data [MIX] that is found at step 511 is not greater than 63, the present processing is terminated. In other words, the value that is found at step 511 is determined to be the mixed data [MIX].

At step 513, the mixed data conversion unit 401 changes the value of the mixed data [MIX] to 63, which is the upper limit value of the 6-bit values (clipping processing). Normally, $MR_C$, $MR_M$, $MR_Y$, $MR_K$, and the bit shift amount BS are set so that [MIX] does not exceed 63, but in order to guarantee the operation even in the case where a wrong numerical value is set, such clipping processing is performed.

The above is the contents of the mixed data conversion processing. Here, a specific example of the mixed data conversion processing in the case where $MR_C$ is 4, $MR_M$ is 6, $MR_Y$ is 6, $MR_K$ is 0, and BS is 4, and $D_C$ is 5, $D_M$ is 8, $D_Y$ is 10, and $D_K$ is 2 is shown.

First, $MR_K$ is 0, and therefore, $D_K'$ is 0 (step 501).

Next, $D_K'$ is 0 and $D_C$ is 5, and therefore, the processing proceeds to step 504 (No at step 502).

At step 504, $D_C$ is 5 and $MR_C$ is 4, and therefore, $D_C'$ is 20.

Then, $D_K'$ is 0 and $D_M$ is 8, and therefore, the processing proceeds to step 507 (No at step 505).

At step 507, $D_M$ is 8 and $MR_M$ is 6, and therefore, $D_M'$ is 48.

Then, $D_K'$ is 0 and $D_Y$ is 10, and therefore, the processing proceeds to step 510 (No at step 508).

At step 510, $D_Y$ is 10 and $MR_Y$ is 6, and therefore, $D_Y'$ is 60.

Then, at step 511, first, the sum value of $D_C'$, $D_M'$, and $D_Y'$ (20+48+60=128) is found and the sum value 128 is shifted to the right by 4 bits in accordance with BS=4. As a result of this, 8 is obtained as the value of the mixed data [MIX].

The value (8) of the mixed data [MIX] obtained at step 511 is smaller than 63 (No at step 512), and therefore, the final value of the mixed data [MIX] is 8.

In this manner, mixed data having a 6-bit value for each pixel, in which each color of CMYK is mixed in arbitrary proportions, is generated. Then, by using the mixed data in the subsequent processing, it is made possible to perform edge correction processing that does not depend on a color to be subjected to processing, and as a result of this, it is possible to suppress a false color that occurs in the edge portion.

The mixed data conversion processing is not limited to the above-described method, and any processing may be accepted as long as the processing generates mixed data by using a plurality of colors.

Further, at step 511 described above, the mixed data [MIX] is obtained by shifting the sum value of the products of the pixel value D of each color and the predetermined mixture ratio MR to the right by the bit shift amount BS, but it may also be possible to obtain the mixed data [MIX] by, for example, using division in place of shifting to the right.

<Edge Determination Processing>

Next, details of edge determination processing that is performed by the edge determination unit 402 are explained.

Figure 6B:
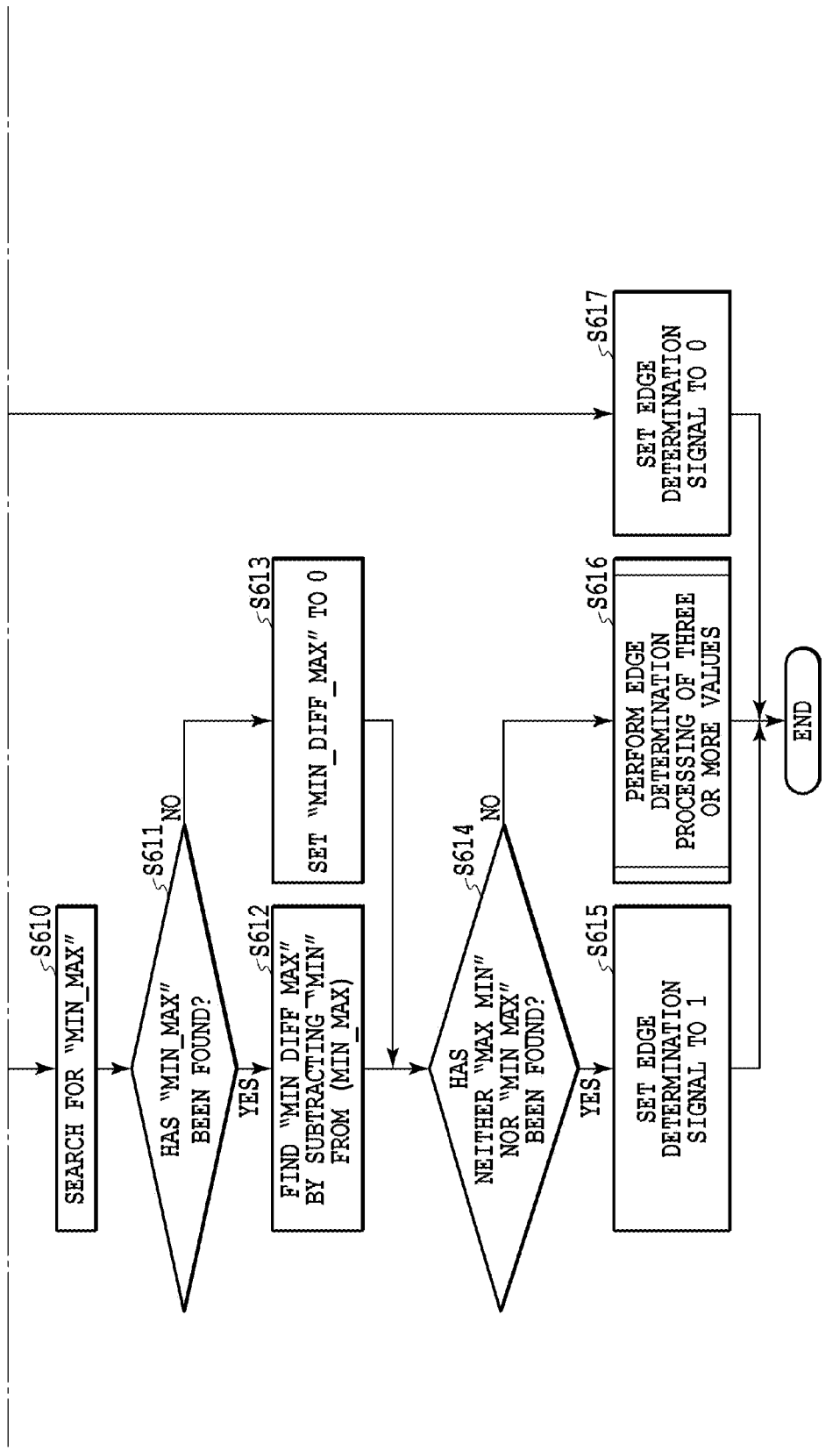
FIG. 6 is a diagram showing a relationship between FIGS. 6A and 6B, and FIGS. 6A and 6B are flowcharts showing a flow of edge determination processing.

FIGS. 6A and 6B are flowcharts showing a flow of the edge determination processing.

At step 601, the edge determination unit 402 finds the greatest pixel value (maximum value [MAX]) among nine pixels in total, i.e., three pixels in the width direction and three pixels in the height direction with the pixel of interest as a center within the above-described reference area for the mixed data generated by the mixed data conversion unit 401.

At step 602, the edge determination unit 402 finds the smallest pixel value (minimum value [MIN]) among nine pixels in total, i.e., three pixels in the width direction and three pixels in the height direction with the pixel of interest as a center within the above-described reference area for the mixed data generated by the mixed data conversion unit 401.

At step 603, the edge determination unit 402 finds a contrast value [CONT] by subtracting the minimum value [MIN] that is found at step 602 from the maximum value [MAX] that is found at step 601.

At step 604, the edge determination unit 402 compares the contrast value [CONT] that is found at step 603 with an edge determination value [Sub] and determines whether the contrast value [CONT] is greater. Here, the edge determination value [Sub] is a threshold value for determining an edge portion of an object and an arbitrary value is set, with which it is possible to determine whether a portion is an edge portion of, for example, a character or line. In the case where the results of the determination indicate that the contrast value [CONT] is greater than the edge determination value [Sub], the processing proceeds to step 605. On the other hand, in the case where the contrast value [CONT] is not greater than the edge determination value [Sub], the processing proceeds to step 617.

At step 605, the edge determination unit 402 finds an average value [AVE] by adding the maximum value [MAX] that is found at step 601 and the minimum value [MIN] that is found at step 602 and by dividing the obtained sum by 2.

At step 606, the edge determination unit 402 searches for a maximum-minimum value [MAX_MIN] from among nine pixels in total, i.e., three pixels in the width direction and three pixels in the height direction with the pixel of interest as a center within the above-described reference area. Here, the maximum-minimum value [MAX_MIN] is the smallest value among the pixel values equal to or greater than the average value [AVE] except for the maximum value [MAX].

At step 607, the edge determination unit 402 determines whether the maximum-minimum value [MAX_MIN] has been found in the search at step 606. In the case where the maximum-minimum value [MAX_MIN] has been found, the processing proceeds to step 608. On the other hand, in the case where the maximum-minimum value [MAX_MIN] has not been found, the processing proceeds to step 609.

At step 608, the edge determination unit 402 finds a difference value [MAX_DIFF_MIN] from the maximum value by subtracting the maximum-minimum value [MAX_MIN] that has been found at step 606 from the maximum value [MAX] that has been found at step 601.

At step 609, the edge determination unit 402 sets the difference value [MAX_DIFF_MIN] from the maximum value to "0" because the maximum-minimum value [MAX_MIN] does not exist.

At step 610, the edge determination unit 402 searches for a minimum-maximum value [MIN_MAX] from among nine pixels in total, i.e., three pixels in the width direction and three pixels in the height direction with the pixel of interest as a center within the above-described reference area. Here, the minimum-maximum value [MIN_MAX] is the greatest value among the pixel values less than the average value [AVE] except for the minimum value [MIN].

At step 611, the edge determination unit 402 determines whether the minimum-maximum value [MIN_MAX] has been found in the search at step 610. In the case where the minimum-maximum value [MIN_MAX] has been found, the processing proceeds to step 612. On the other hand, in the case where the minimum-maximum value [MIN_MAX] has not been found, the processing proceeds to step 613.

At step 612, the edge determination unit 402 finds a difference value [MIN_DIFF_MAX] from the minimum value by subtracting the minimum value [MIN] that has been found at step 602 from the minimum-maximum value [MIN_MAX] that has been found at step 611.

At step 613, the edge determination unit 402 sets the difference value [MIN_DIFF_MAX] from the minimum value to "0" because the minimum-maximum value [MIN_MAX] does not exist.

At step 614, the edge determination unit 402 determines whether neither the maximum-minimum value [MAX_MIN] nor the minimum-maximum value [MIN_MAX] described above has been found. In the case where neither of them has been found, the processing proceeds to step 615. On the other hand, in the case where either of them has been found, the processing proceeds to step 616.

At the point in time the processing has proceeded to step 615, it is made clear that neither the maximum-minimum value [MAX_MIN] nor the minimum-maximum value [MIN_MAX] has been found (Yes at step 614) and the contrast value [CONT] is sufficiently great (Yes at step 604). Consequently, the edge determination unit 402 determines that the reference area is an area in which there is an abrupt change in pixel value (i.e., the pixel is an edge pixel that needs edge correction), and therefore, sets the edge determination signal to "1 (ON)" and the present processing is terminated.

Figure 7:
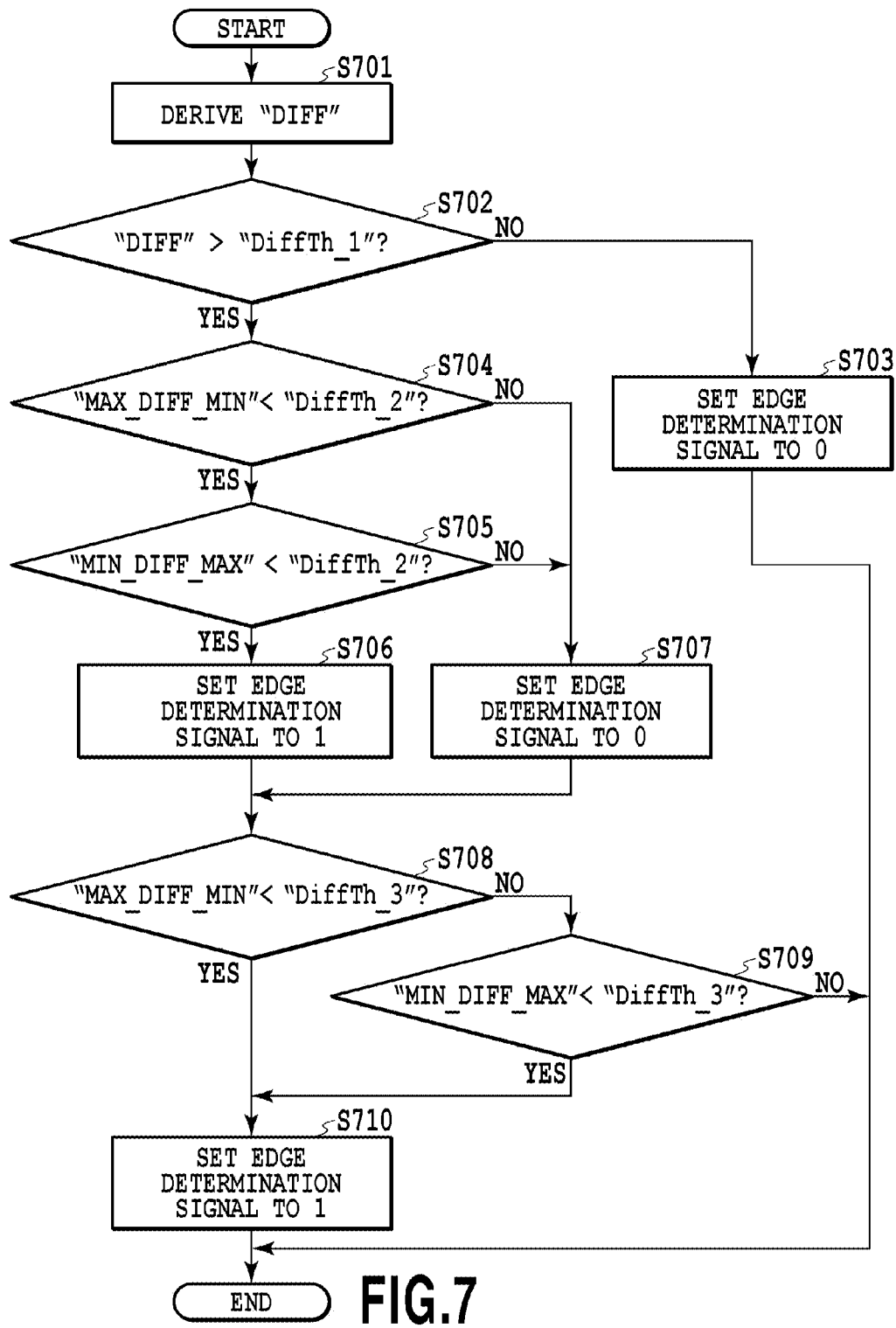
FIG. 7 is a flowchart showing details of the edge determination processing of three or more values.

At step 616, the edge determination unit 402 performs processing (edge determination processing of three or more values) to determine whether or not an edge is an edge that needs correction in the case where there are three or more pixel values in the above-described reference area. The edge determination processing of three or more values is processing intended to detect an edge that exists in a character or natural image that has deteriorated due to compression processing or the like. FIG. 7 is a flowchart showing details of the edge determination processing of three or more values. Hereinafter, detailed explanation is given.

At step 701, the edge determination unit 402 finds a variance value [DIFF] indicating a distribution of values in the vicinity of the average value by subtracting the difference value [MAX_DIFF_MIN] from the maximum value and the difference value [MIN_DIFF_MAX] from the minimum value from the contrast value [CONT] that has been found at step 603.

At step 702, the edge determination unit 402 determines whether or not the variance value [DIFF] that has been found at step 701 is greater than a first threshold value [DiffTh_1]. The first threshold value is a threshold value for determining whether the difference between the greatest minimum value and the smallest maximum value is sufficiently great. Because of this, as the first threshold value, a value representing a signal value difference that is desired to be detected as an edge is set. It is desirable to set the first threshold value to a value somewhat smaller than the edge determination value [Sub]. In the case where the variance value [DIFF] is greater than the first threshold value [DiffTh_1], the processing proceeds to step 704. On the other hand, in the case where the variance value [DIFF] is not greater than the first threshold value [DiffTh_1], the processing proceeds to step 703.

At step 703, the edge determination unit 402 determines that the reference area is an area in which there is no abrupt change in pixel value because the variance value [DIFF] that has been found at step 701 is not a sufficiently great value. In other words, the edge determination unit 402 determines that the pixel is a non-edge pixel that does not need edge correction, and therefore, sets the edge determination signal to "0 (OFF)" and the present processing is terminated.

At step 704, the edge determination unit 402 determines whether or not the above-described difference value [MAX_DIFF_MIN] from the maximum value is smaller than a second threshold value [DiffTh_2]. The second threshold value and a third threshold value, to be described later, are threshold values for determining whether the difference value [MAX_DIFF_MIN] from the maximum value and the difference value [MIN_DIFF_MAX] from the minimum value are sufficiently small. The portion in which the difference value [MAX_DIFF_MIN] from the maximum value and the difference value [MIN_DIFF_MAX] from the minimum value are great means the portion in which there is a change, such as a gradation portion. It is undesirable to detect a portion in which the slope of the change in gradation is steep as an edge, and therefore, determination is performed by using the second and third threshold values. It is desirable to set the second and third threshold values to values sufficiently small compared to the first threshold value. The reason is that the greater the second and third threshold values become, the more likely a portion in which a contrast exists and a variation in signal value exists is determined to be an edge. In the case where the difference value [MAX_DIFF_MIN] from the maximum value is smaller than the second threshold value [DiffTh_2], the processing proceeds to step 705. On the other hand, in the case where the difference value [MAX_DIFF_MIN] from the maximum value is not smaller than the second threshold value [DiffTh_2], the processing proceeds to step 707.

At step 705, the edge determination unit 402 determines whether or not the above-described difference value [MIN_DIFF_MAX] from the minimum value is smaller than the second threshold value [DiffTh_2]. In the case where the difference value [MIN_DIFF_MAX] from the minimum value is smaller than the second threshold value [DiffTh_2], the processing proceeds to step 706. On the other hand, in the case where the difference value [MIN_DIFF_MAX] from the minimum value is not smaller than the second threshold value [DiffTh_2], the processing proceeds to step 707.

At step 706, the edge determination unit 402 determines the reference area is an area in which there is an abrupt change in pixel value because both the difference value [MAX_DIFF_MIN] from the maximum value and the difference value [MIN_DIFF_MAX] from the minimum value are sufficiently small. In other words, the edge determination unit 402 determines that the pixel is an edge pixel that needs edge correction, and therefore, sets the edge determination signal to "1 (ON)" and then the processing proceeds to step 708.

At step 707, the edge determination unit 402 determines that the reference area is an area in which there is no abrupt change in pixel value. In other words, the edge determination unit 402 determines that the pixel is a non-edge pixel that does not need edge correction, and therefore, sets the edge determination signal to "0 (OFF)" and then the processing proceeds to step 708.

At step 708, the edge determination unit 402 determines whether or not the difference value [MAX_DIFF_MIN] from the maximum value is smaller than the third threshold value [DiffTh_3]. In the case where the difference value [MAX_DIFF_MIN] from the maximum value is smaller than the third threshold value [DiffTh_3], the processing proceeds to step 710. On the other hand, in the case where the difference value [MAX_DIFF_MIN] from the maximum value is not smaller than the third threshold value [DiffTh_3], the processing proceeds to step 709.

At step 709, the edge determination unit 402 determines whether or not the difference value [MIN_DIFF_MAX] from the minimum value is smaller than the third threshold value [DiffTh_3]. In the case where the difference value [MIN_DIFF_MAX] from the minimum value is smaller than the third threshold value [DiffTh_3], the processing proceeds to step 710. On the other hand, in the case where the difference value [MIN_DIFF_MAX] from the minimum value is not smaller than the third threshold value [DiffTh_3], the present processing is terminated.

At step 710, the edge determination unit 402 determines that the reference area is an area in which there is an abrupt change in pixel value because one of the difference value [MAX_DIFF_MIN] from the maximum value and the difference value [MIN_DIFF_MAX] from the minimum value is sufficiently small. In other words, the edge determination unit 402 determines that the pixel is an edge pixel that needs edge correction, and therefore, sets the edge determination signal to "1 (ON)" and the present processing is terminated.

In the above-described explanation, the description is given on the assumption that the number of edge determination values, the number of first threshold values, the number of second threshold values, and the number of third threshold values are each one, but it may also be possible to prepare a plurality of these values and to select and use one of them in accordance with necessity. For example, it may also be possible to further refer to the attribute data, and in the case where the attribute of the pixel of interest is an image, to switch the edge determination value and the first threshold value to values greater than those of other attributes, and to switch the second and third threshold values to smaller values, respectively. Further, in the case where the attribute of the pixel of interest is a character or line, it may also be possible to switch the edge determination value and the first threshold value to values smaller than those of other attributes, and to switch the second and third threshold values to greater values, respectively. By performing such switching, it is made possible to perform close control so that the image attribute in which the color and shape become complicated easily is less likely to be affected by correction, and the character attribute or line attribute in which the color and shape become uniform easily is more likely to be affected by correction.

The above is the contents of the edge determination processing of three or more values.

Explanation is returned to the flowchart in FIG. 6B.

At step 617, the edge determination unit 402 determines that the reference area is an area in which there is no abrupt change in pixel value because the contrast value [CONT] is small (No at step 604). In other words, the edge determination unit 402 determines that the reference area is an area consisting of a non-edge pixel that does not need edge correction, and therefore, sets the edge determination signal to "0 (OFF)" and the present processing is terminated.

Figure 8:
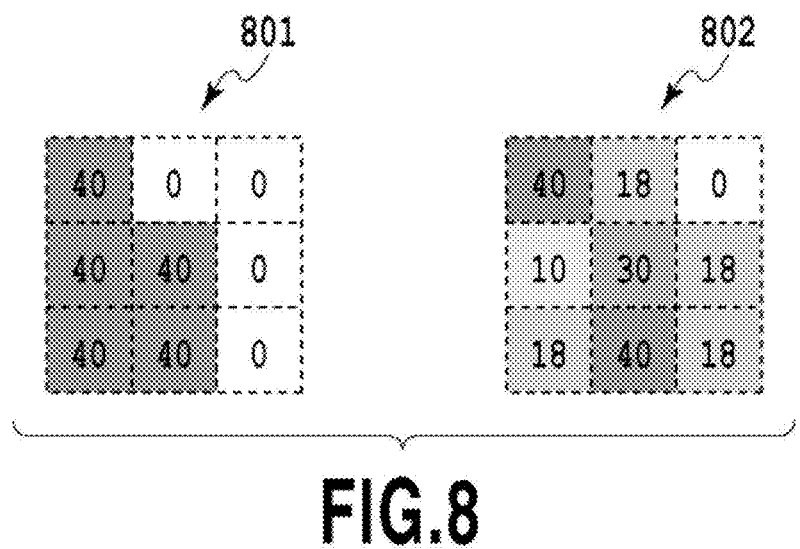
FIG. 8 is a diagram explaining a specific example of the edge determination processing.

The above is the contents of the edge determination processing. Here, a specific example of the edge determination processing is explained by using FIG. 8. FIG. 8 shows an image 801 of 3×3 pixels, which is desired to be detected as an edge, and an image 802 of 3×3 pixels, which is not desired to be detected as an edge. The image 801 and the image 802 have the same contrast.

First, the maximum value [MAX] of both the image 801 and the image 802 is "40" (step 601) and the minimum value [MIN] is "0" (step 602). Then, the contrast of both the image 801 and the image 802 is "40" (step 603).

Then, in the case where the edge determination value [Sub] is "20", the processing proceeds to step 605 for both the images (Yes at step 604) and as its average value [AVE], "20" is derived for both the images.

At the subsequent step, the maximum-minimum value [MAX_MIN] does not exist in the case of the image 801 (No at step 607), and therefore, the difference value [MAX_DIFF_MIN] from the maximum value is "0" (step 609). In contrast to this, in the case of the image 802, the maximum-minimum value [MAX_MIN] exists (Yes at step 607), and therefore, as the difference value [MAX_DIFF_MIN] from the maximum value, "10 (=40−30)" is obtained (step 608).

Then, in the case of the image 801, the minimum-maximum value [MIN_MAX] does not also exist (No at step 611), and therefore, the difference value [MIN_DIFF_MAX] from the minimum value is also "0" (step 613). In contrast to this, in the case of the image 802, the minimum-maximum value [MIN_MAX] exists (Yes at step 611), and therefore, "18 (=18−0)" is obtained as the difference value [MIN_DIFF_MAX] from the minimum value (step 612).

By the processing hitherto, as to the image 801, neither the maximum-minimum value [MAX_MIN] nor the minimum-maximum value [MIN_MAX] exists (Yes at step 614), and therefore, the edge determination signal is set to ON (step 615). In other words, the image 801 is determined to be an edge portion. On other hand, as to the image 802, both the maximum-minimum value [MAX_MIN] and the minimum-maximum value [MIN_MAX] exist, and therefore, the processing proceeds to the edge determination processing of three or more values as a result.

In the edge determination processing of three or more values for the image 802, first, the variance value [DIFF] is derived (step 701). Here, the contrast [CONST] is "40", the difference value [MAX_DIFF_MIN] from the maximum value is "10", and the difference value [MIN_DIFF_MAX] from the minimum value is "18", and therefore, the variance value [DIFF] is "12".

Then, in the case where the first threshold value [DiffTh_1] at step 702 is "16" (No at step 702), the edge determination signal is set to OFF (step 703). In other words, the image 802 is determined not to be an edge portion.

As described above, in the flowcharts in FIGS. 6A and 6B, in the case of a simple area in which there are two or less pixel values within the reference area, whether the reference area is an edge portion that needs correction is determined by using only the contrast value [CONT]. However, the aspect is not limited to such an aspect. For example, it may also be possible to determine whether the reference area is an area consisting of an edge that needs edge correction based on only whether or not the contrast value within the reference area is sufficiently great regardless of the state within the reference area. What is required is the ability to appropriately determine whether or not edge correction processing should be applied to the edge portion.

(Edge Direction Determination Processing)

Next, details of edge direction determination processing that is performed by the edge direction determination unit 404 are explained.

Figure 9:
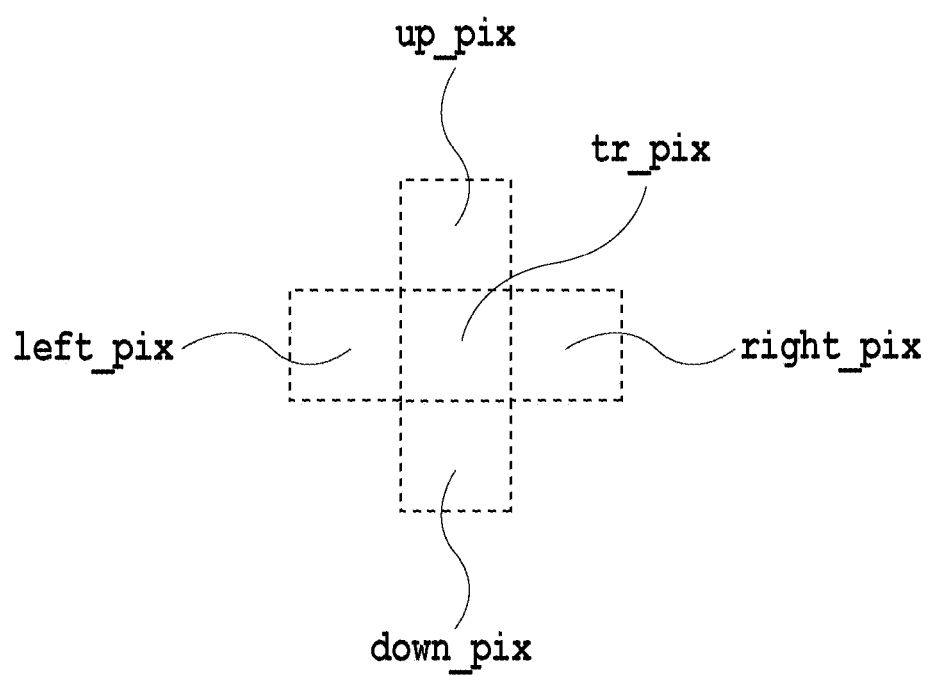
FIG. 9 is a diagram showing a position relationship between a pixel of interest and four pixels that are referred to by an edge direction determination unit.
Figure 10:
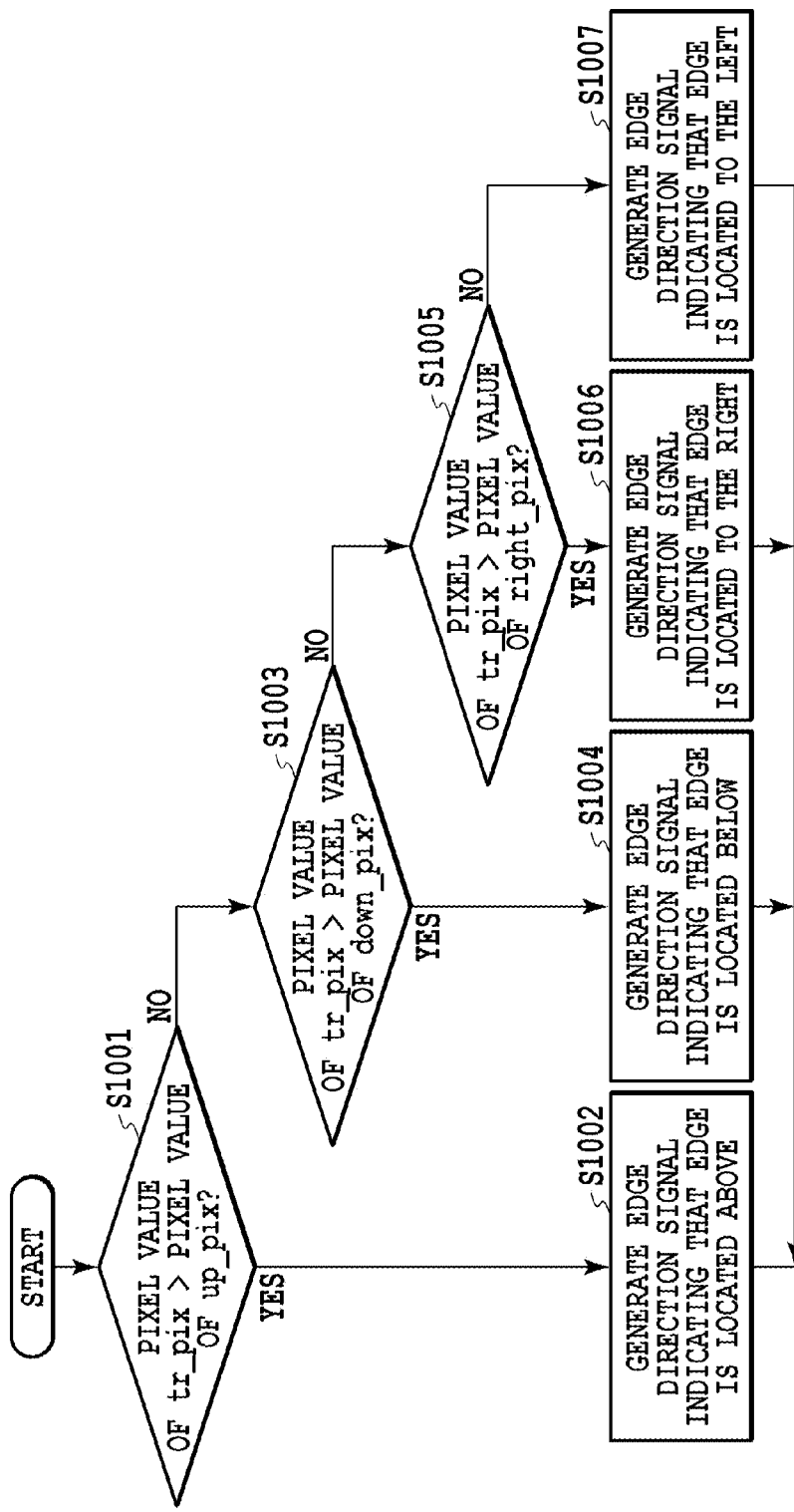
FIG. 10 is a flowchart showing a flow of edge direction determination processing.

FIG. 9 is a diagram showing a position relationship between the pixel of interest and four pixels that are referred to by the edge direction determination unit 404. In FIG. 9, the pixel of interest is denoted by [tr_pix], the pixel leftward adjacent to the pixel of interest by [left_pix], the pixel rightward adjacent to the pixel of interest by [right_pix], the pixel upwardly adjacent to the pixel of interest by [up_pix], and the pixel downwardly adjacent to the pixel of interest by [down_pix], respectively. FIG. 10 is a flowchart showing a flow of the edge direction determination processing.

At step 1001, the edge direction determination unit 404 compares the pixel value of the pixel of interest with the pixel value of the pixel upwardly adjacent to the pixel of interest and determines whether the pixel value of the pixel of interest is greater. In the case where the pixel value of the pixel of interest is greater, the processing proceeds to step 1002. On the other hand, in the case where the pixel value of the pixel of interest is not greater, the processing proceeds to step 1003.

At step 1002, the edge direction determination unit 404 generates an edge direction signal [Edge_Dir] indicating that the edge is located above the pixel of interest. In the present embodiment, the edge direction signal [Edge_Dir] is a 2-bit signal and "00" is set as a value indicating that the edge is located above the pixel of interest. The generated edge direction signal [Edge_Dir] is sent to the determination results integration unit 405 and the present processing is terminated.

At step 1003, the edge direction determination unit 404 compares the pixel value of the pixel of interest with the pixel value of the pixel downwardly adjacent to the pixel of interest and determines whether the pixel value of the pixel of interest is greater. In the case where the pixel value of the pixel of interest is greater, the processing proceeds to step 1004. On the other hand, in the case where the pixel value of the pixel of interest is not greater, the processing proceeds to step 1005.

At step 1004, the edge direction determination unit 404 generates the edge direction signal [Edge_Dir] indicating that the edge is located below the pixel of interest. Specifically, as a value indicating that the edge is located below the pixel of interest, "01" is set to the edge direction signal [Edge_Dir]. The generated edge direction signal [Edge_Dir] is sent to the determination results integration unit 405 and the present processing is terminated.

At step 1005, the edge direction determination unit 404 compares the pixel value of the pixel of interest with the pixel value of the pixel rightward adjacent to the pixel of interest and determines whether the pixel value of the pixel of interest is greater. In the case where the pixel value of the pixel of interest is greater, the processing proceeds to step 1006. On the other hand, in the case where the pixel value of the pixel of interest is not greater, the processing proceeds to step 1007.

At step 1006, the edge direction determination unit 404 generates the edge direction signal [Edge_Dir] indicating that the edge is located to the right of the pixel of interest. Specifically, as a value indicating that the edge is located to the right of the pixel of interest, "10" is set to the edge direction signal [Edge_Dir]. The generated edge direction signal [Edge_Dir] is sent to the determination results integration unit 405 and the present processing is terminated.

At step 1007, the edge direction determination unit 404 generates the edge direction signal [Edge_Dir] indicating that the edge is located to the left of the pixel of interest. Specifically, as a value indicating that the edge is located to the left of the pixel of interest, "11" is set to the edge direction signal [Edge_Dir]. The generated edge direction signal [Edge_Dir] is sent to the determination results integration unit 405 and the present processing is terminated.

The above is the contents of the edge direction determination processing. By means of the edge direction signal, it is known which direction the pixel of interest exists in with respect to the edge.

<Edge Correction Data Generation Processing>

Next, details of edge correction data generation processing in the edge correction data generation unit 304 are explained.

The edge correction data generation unit 304 generates edge correction data by referring to a table or the like prepared in advance (e.g., a one-dimensional lookup table: LUT). Specifically, the edge correction data generation unit 304 determines an output value corresponding to a predetermined input value (converts a predetermined input value into an output value) by referring to the LUT and takes the output value to be edge correction data. In the present embodiment, it is assumed that the above-described edge correction data is generated after converting input image data from 8-bit data into 4-bit data. FIGS. 11A, 11B, and 11C show examples of a lookup table used in the edge correction data generation processing. In each LUT shown in FIGS. 11A to 11C, 4-bit (0 to 15) input values and 4-bit output values are associated with each other in a one-to-one manner. FIG. 11A shows an LUT having linear characteristics in which the input value is output as it is. FIGS. 11B and 11C show LUTs having nonlinear characteristics in accordance with the characteristics of a printer. FIG. 11B shows an LUT in which the output value takes a value smaller than the input value and which is used in the case where the gradation characteristics of a printer are denser than normal, or in the case where the edge correction effect is made less strong.

FIG. 11C shows an LUT in which the output value takes a value greater than the input value and which is used in the case where the gradation characteristics of a printer are less dense than normal, or in the case where the edge correction effect is made strong.

<Screen Processing>

Next, screen processing in the screen processing unit 305 is explained.

Figure 12:
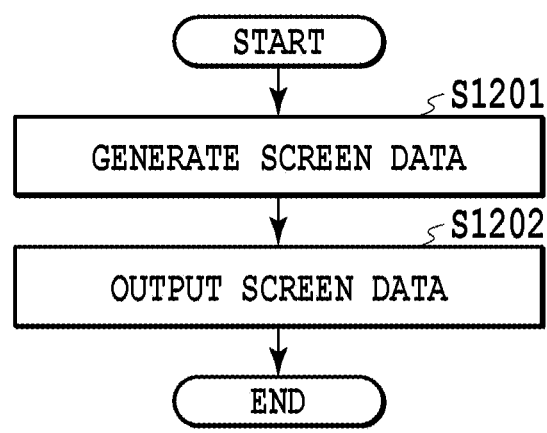
FIG. 12 is a flowchart showing a flow of screen processing that is performed by a screen processing unit.

FIG. 12 is a flowchart showing a flow of screen processing that is performed by the screen processing unit 305. The screen processing is processing to convert input image data into 4-bit image data that the printer unit 103 can print by using a dither matrix that is set in advance.

At step 1201, the screen processing unit 305 converts image data into 4-bit screen data by a multivalued dither method using a predetermined dither matrix. The multivalued dither method using a dither matrix is a well-known technique, and therefore, explanation is omitted.

At step 1202, the screen processing unit 305 outputs the screen data obtained at step 1201 to the image combination unit 307.

The above is the contents of the screen processing in the screen processing unit 305.

<Phase-shifted Screen Processing>

Next, screen processing in which the phase is shifted, which is performed by the phase-shifted screen processing unit 306 is explained in detail. Due to this processing, it is made possible to shift the screen dot in the edge portion into the inside of the object in the subsequent processing in the image combination unit 307. The flow of the screen processing in the phase-shifted screen processing unit 306 is the same as the flow of the above-described screen processing in the screen processing unit 305, and therefore, in the following, only different points are explained.

Figure 13A:
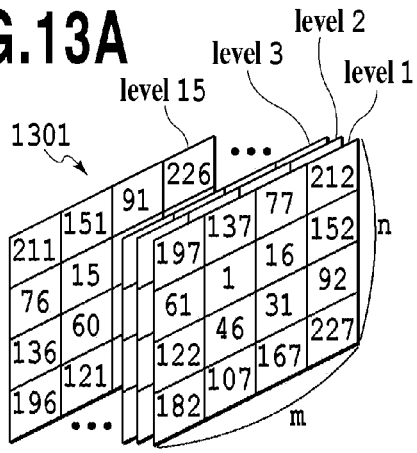
FIGS. 13A to 13E are diagrams explaining dither matrixes in which the phase is shifted.
Figure 13B:
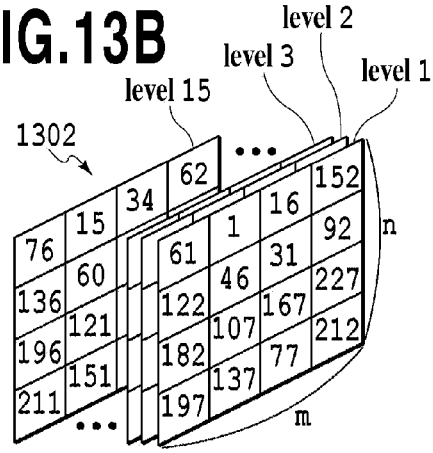
Figure 13C:
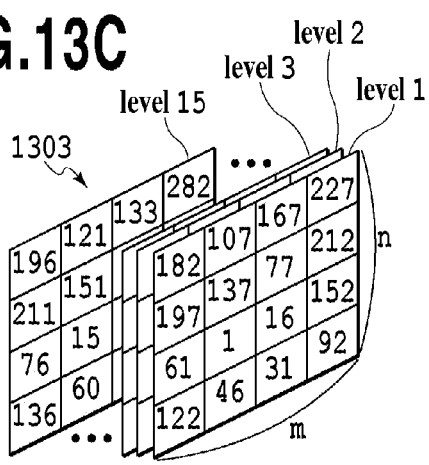
Figure 13D:
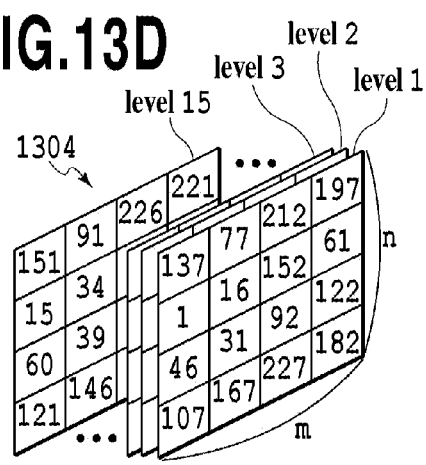
Figure 13E:
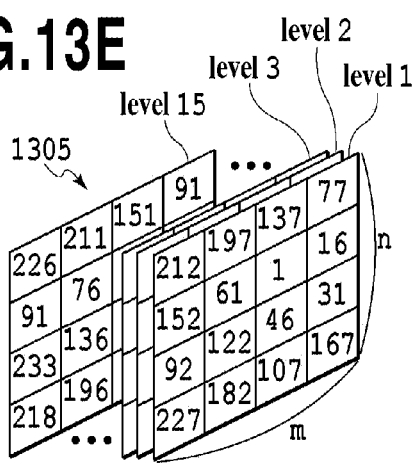

At step 1201 described previously, the phase-shifted screen processing unit 306 converts image data into 4-bit screen data by the multivalued dither method using a dither matrix in which the phase is shifted. Specifically, the phase-shifted screen processing unit 306 converts image data into screen data by using a dither matrix, which is the dither matrix used by the screen processing unit 305 and in which the phase is shifted in the upward, downward, leftward, or rightward direction by one pixel. FIGS. 13A to 13E are diagrams explaining dither matrixes in which the phase is shifted. A dither matrix 1301 consisting of levels 1 to 15 shown in FIG. 13A is a dither matrix that is used by the screen processing unit 305. Dither matrixes 1302 to 1305 consisting of levels 1 to 15 shown in FIGS. 13B to 13E are dither matrixes that are used by the phase-shifted screen processing unit 306 and in which the phase of the dither matrix 1301 is shifted in the upward, downward, leftward, and rightward directions, respectively, by one cell (pixel). In other words, FIG. 13B shows a dither matrix obtained by shifting the phase of the dither matrix 1301 in the upward direction by one cell, FIG. 13C shows a dither matrix obtained by shifting the phase in the downward direction by one cell, FIG. 13D shows a dither matrix obtained by shifting the phase in the leftward direction by one cell, and FIG. 13E shows a dither matrix obtained by shifting the phase in the rightward direction by one cell.

FIGS. 14A to 14F are diagrams explaining the screen processing results obtained by the screen processing unit 305 and the screen processing results obtained by the phase-shifted screen processing unit 306 by comparison. FIG. 14A shows image data that is input to both the screen processing units and in which an object 1401 in the shape of a rectangle of 12 vertical pixels×7 horizontal pixels exists.

FIG. 14B shows screen data that is generated by the screen processing in the screen processing unit 305. A pixel group 1402 is a pixel group consisting of halftone dots converted by halftone processing.

FIGS. 14C to 14F show screen data that is generated by the screen processing in the phase-shifted screen processing unit 306 in which the phase is shifted in the upward, downward, leftward, and rightward directions, respectively, by one cell. In FIGS. 14C to 14F, pixel groups 1403 to 1406 are pixel groups consisting of halftone dots converted by halftone processing, each corresponding to the pixel group 1402 in FIG. 14B. The phase of the pixel group 1403 in FIG. 14C is shifted in the upward direction by one cell compared to that of the pixel group 1402. Similarly, the phase of the pixel group 1404 in FIG. 14D is shifted in the downward direction by one cell compared to that of the pixel group 1402. Then, the phase of the pixel group 1405 in FIG. 14E is shifted in the leftward direction by one cell compared to that of the pixel group 1402 and the phase of the pixel group 1406 in FIG. 14F is shifted in the rightward direction by one cell compared to that of the pixel group 1402.

<Image Combination Processing>

Figure 15B:
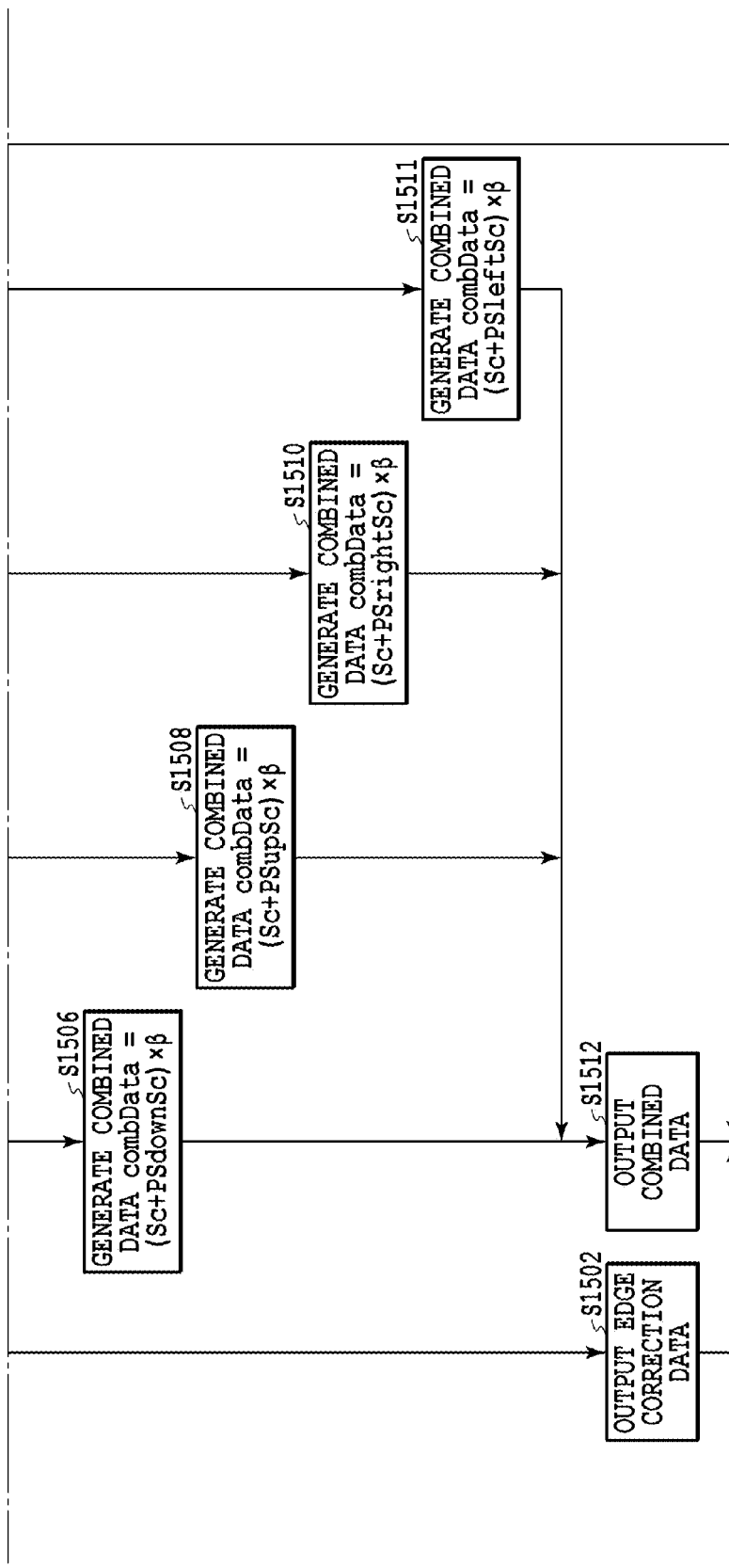
FIG. 15 is a diagram showing a relationship between FIGS. 15A and 15B, and FIGS. 15A and 15B are flowcharts showing a flow of image combination processing according to the first embodiment.

Next, image combination processing that is performed by the image combination unit 307 is explained. FIGS. 15A and 15B are flowcharts showing a flow of the image combination processing that is performed by the image combination unit 307. The following processing is performed on all the pixels within input image data (image data after gamma correction).

At step 1501, the image combination unit 307 determines whether or not the pixel of interest is an edge pixel based on edge information that is input from the edge information generation unit 302. Specifically, the image combination unit 307 refers to the data of the high-order one bit of the edge information and determines that the pixel of interest is an edge pixel in the case where the value is "1", and then the processing proceeds to step 1502. On the other hand, in the case where the value of the high-order one bit is "0", the image combination unit 307 determines that the pixel of interest is a non-edge pixel, and then the processing proceeds to step 1503.

At step 1502, the image combination unit 307 outputs the pixel value of the pixel of interest in the edge correction data that is input from the edge correction data generation unit 304 to the printer unit 103 as output image data.

At step 1503, the image combination unit 307 determines whether or not an edge pixel exists among the peripheral pixels of the pixel of interest (peripheral eight pixels surrounding the pixel of interest) by referring to the edge information that is input from the edge information generation unit 302. In the case where an edge pixel exists among the peripheral pixels, the processing proceeds to step 1504. On the other hand, in the case where an edge pixel does not exit among the peripheral pixels, the processing proceeds to step 1513.

Figure 16:
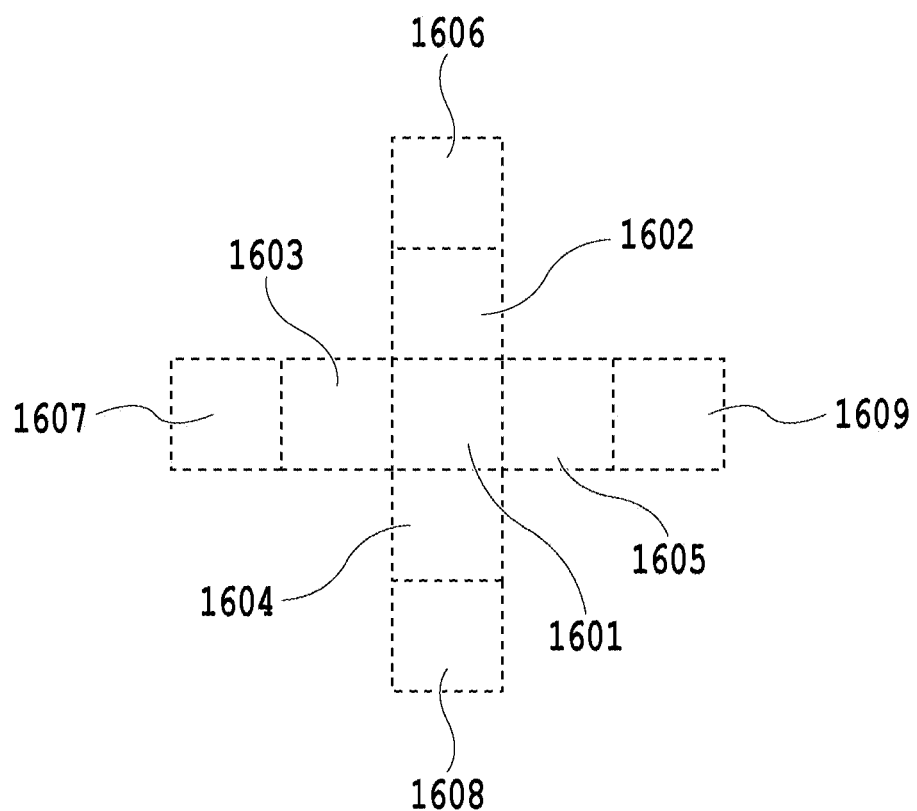
FIG. 16 is a diagram explaining reference pixels.

At step 1504, the image combination unit 307 determines whether the pixel of interest is a pixel that contacts with an edge pixel from the inside by comparing the pixel value of the pixel of interest with the pixel value of a predetermined reference pixel (whether the pixel of interest is a pixel inside the object). Here, the reference pixel refers to a pixel adjacent to the pixel of interest and which is in the position relationship as shown in FIG. 16. In FIG. 16, a pixel 1601 at the center is the pixel of interest and other pixels 1602 to 1609 are reference pixels. Then, whether the pixel of interest is a pixel that contacts with an edge pixel from the inside is determined in accordance with the following conditions.

In the case where the high-order one bit of the edge information of the reference pixel 1602 is "1", on a condition that the value obtained by subtracting the pixel value of the reference pixel 1606 from the pixel value of the pixel of interest 1601 is greater than "0", it is determined that the pixel of interest is a pixel that contacts with an edge pixel from the inside.

In the case where the high-order one bit of the edge information of the reference pixel 1603 is "1", on a condition that the value obtained by subtracting the pixel value of the reference pixel 1607 from the pixel value of the pixel of interest 1601 is greater than "0", it is determined that the pixel of interest is a pixel that contacts with an edge pixel from the inside.

In the case where the high-order one bit of the edge information of the reference pixel 1604 is "1", on a condition that the value obtained by subtracting the pixel value of the reference pixel 1608 from the pixel value of the pixel of interest 1601 is greater than "0", it is determined that the pixel of interest is a pixel that contacts with an edge pixel from the inside.

In the case where the high-order one bit of the edge information of the reference pixel 1605 is "1", on a condition that the value obtained by subtracting the pixel value of the reference pixel 1608 from the pixel value of the pixel of interest 1601 is greater than "0", it is determined that the pixel of interest is a pixel that contacts with an edge pixel from the inside.

In the case where the above-described four conditions are not met, it is determined that the pixel of interest is not a pixel that contacts with an edge pixel from the inside.

In the case where the results of the determination indicate that the pixel of interest is a pixel that contacts with an edge pixel from the inside, the processing proceeds to step 1505. On the other hand, in the case where it is determined that the pixel of interest is not a pixel that contacts with an edge pixel from the inside, the processing proceeds to step 1513.

At step 1505, the image combination unit 307 determines whether there is an edge above the pixel of interest (whether the value of the low-order two bits of the edge information is "00") by referring to the edge information. In the case where the value of the low-order two bits is "00", it is determined that there is an edge above the pixel of interest and the processing proceeds to step 1506. On the other hand, in the case where the value of the low-order two bits is not "00", the processing proceeds to step 1507.

At step 1506, the image combination unit 307 combines the output results of the screen processing unit 305 and the phase-shifted screen processing unit 306 and generates combined data [combData]. At this step, screen data in which the phase is shifted in the direction opposite to the direction of the edge (here, the upward direction) is combined in order to move the screen dot into the inside of the object. Specifically, the combined data [combData] is obtained by adding screen data [PSdownSc] in which the phase is shifted downward among the output results of the phase-shifted screen processing unit 306 to output results [Sc] of the screen processing unit 305 and by multiplying the sum by a combination coefficient 13 determined in advance.

At step 1507, the image combination unit 307 determines whether there is an edge below the pixel of interest (whether the value of the low-order two bits of the edge information is "01") by referring to the edge information. In the case where the value of the low-order two bits is "01", it is determined that there is an edge below the pixel of interest and the processing proceeds to step 1508. On the other hand, in the case where the value of the low-order two bits is not "01", the processing proceeds to step 1509.

At step 1508, the image combination unit 307 combines the output results of the screen processing unit 305 and the phase-shifted screen processing unit 306 and generates the combined data [combData]. At this step, screen data in which the phase is shifted in the direction opposite to the direction of the edge (here, the downward direction) is combined in order to move the screen dot into the inside of the object. Specifically, the combined data [combData] is obtained by adding screen data [PSupSc] in which the phase is shifted upward among the output results of the phase-shifted screen processing unit 306 to the output results [Sc] of the screen processing unit 305 and by multiplying the sum by the combination coefficient β determined in advance.

At step 1509, the image combination unit 307 determines whether there is an edge to the left of the pixel of interest (whether the value of the low-order two bits of the edge information is "10") by referring to the edge information. In the case where the value of the low-order two bits is "10", it is determined that there is an edge to the left of the pixel of interest, and the processing proceeds to step 1510. On the other hand, in the case where the value of the low-order two bits is not "10", it is determined that an edge exists to the right of the pixel of interest, and the processing proceeds to step 1511.

At step 1510, the image combination unit 307 combines the output results of the screen processing unit 305 and the phase-shifted screen processing unit 306 and generates the combined data [combData]. At this step, screen data in which the phase is shifted in the direction opposite to the direction of the edge (here, the leftward direction) is combined in order to move the screen dot into the inside of the object. Specifically, the combined data [combData] is obtained by adding screen data [PSrightSc] in which the phase is shifted rightward among the output results of the phase-shifted screen processing unit 306 to the output results [Sc] of the screen processing unit 305 and by multiplying the sum by the combination coefficient β determined in advance.

At step 1511, the image combination unit 307 combines the output results of the screen processing unit 305 and the phase-shifted screen processing unit 306 and generates the combined data [combData]. At this step, screen data in which the phase is shifted in the direction opposite to the direction of the edge (here, the rightward direction) is combined in order to move the screen dot into the inside of the object. Specifically, the combined data [combData] is obtained by adding screen data [PSleftSc] in which the phase is shifted leftward among the output results of the phase-shifted screen processing unit 306 to the output results [Sc] of the screen processing unit 305 and by multiplying the sum by the combination coefficient β determined in advance.

At step 1512, the image combination unit 307 outputs the combined data [combData] generated with respect to the pixel of interest to the printer unit 103 as output image data.

At step 1513, the image combination unit 307 outputs the pixel value of the pixel of interest in the screen data [Sc], which is the output results of the screen processing unit 305, to the printer unit 103 as output image data.

The above-described processing is repeated until there is no longer a pixel on which the processing has not been performed yet within the input image data. The above is the contents of the image combination processing. As described above, the image data that is output (pixel value of the pixel of interest) is appropriately switched between the edge correction data, the combined data, and the screen data in accordance with the edge information and the image data after gamma correction.

In the present embodiment, the combined data is generated by multiplying the combination coefficient β, but the generation method is not limited to this. For example, it may also be possible to generate combined data by inputting the value obtained by adding the processing results of the screen processing unit 305 and the phase-shifted screen processing unit 306 to a one-dimensional lookup table.

Finally, a difference between the case where the present embodiment is applied and the case where the present embodiment is not applied is explained with reference to FIG. 17A to FIG. 17F to FIG. 19A to FIG. 19D.

FIGS. 17A to 17F are diagrams explaining examples of the case where edge correction processing is performed without using the results of the phase-shifted screen processing.

Figure 17A:
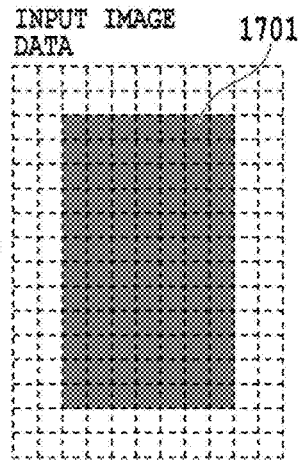
FIGS. 17A to 17F are diagrams explaining examples of the case where edge correction processing is performed without using the results of phase-shifted screen processing.

FIG. 17A shows image data that is input to the screen processing unit 305, and as in FIG. 14A described previously, a rectangular object 1701 of 12 vertical pixels×7 horizontal pixels exists.

Figure 17B:
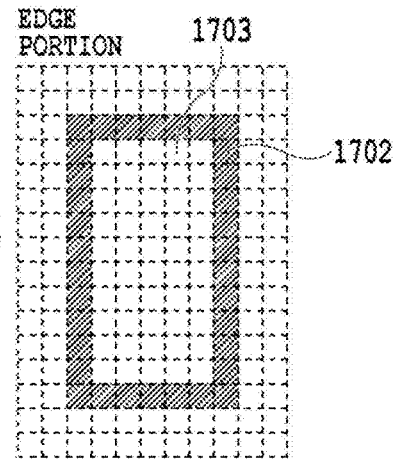

FIG. 17B is a diagram showing an edge pixel whose high-order one bit of the edge information (that is input to the image combination unit 307) is "1" by slashes. To edge pixels 1702, the edge correction data is applied and to pixels 1703 within an inside area of the edge pixel 1702, the screen data is applied.

Figure 17C:
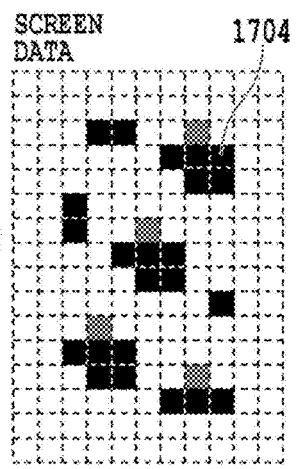

FIG. 17C is a diagram showing screen data that is generated by the screen processing unit 305. A pixel group 1704 is a pixel group consisting of halftone dots converted by halftone processing.

Figure 17D:
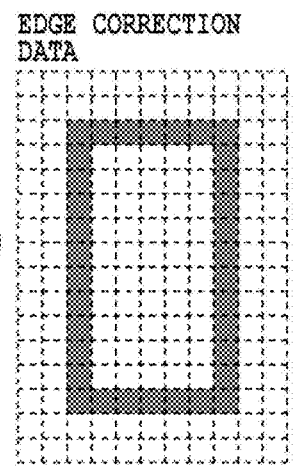

FIG. 17D is a diagram showing edge correction data that is input to the image combination unit 307 and pixel values of pixels represented in gray are the pixel values in the edge pixels 1702 shown in FIG. 17B.

Figure 17E:
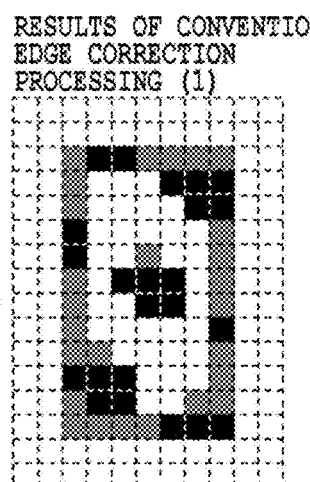

FIG. 17E is a diagram showing an example of the results of the edge correction processing according to the prior art. In this case, on the edge pixels 1702, the combination processing to compare the screen data shown in FIG. 17C with the edge correction data shown in FIG. 17D and to take the greater value to be an output value is performed.

Figure 17F:
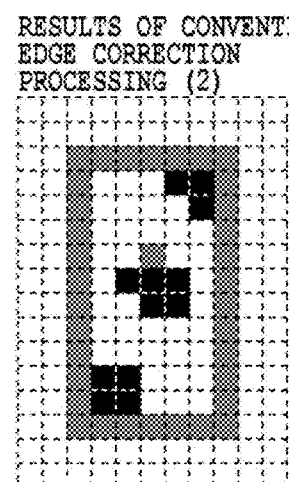

FIG. 17F is a diagram showing an example of the results of the edge correction processing according to another prior art. In this case, on the edge pixels 1702, the combination processing that uses the edge correction data shown in FIG. 17D as it is performed.

FIGS. 18A to 18F are diagrams explaining examples of the case where the edge correction processing is performed by applying the present embodiment.

Figure 18A:
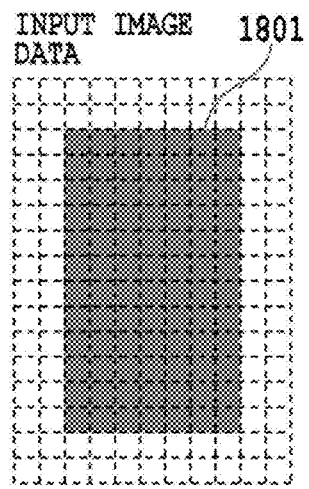
FIGS. 18A to 18F are diagrams explaining examples of the case where the edge correction processing is performed by applying the first embodiment.

FIG. 18A shows image data that is input to the screen processing unit 305 and as in FIG. 17A, a rectangular object 1801 of 12 vertical pixels×7 horizontal pixels exists.

Figure 18B:
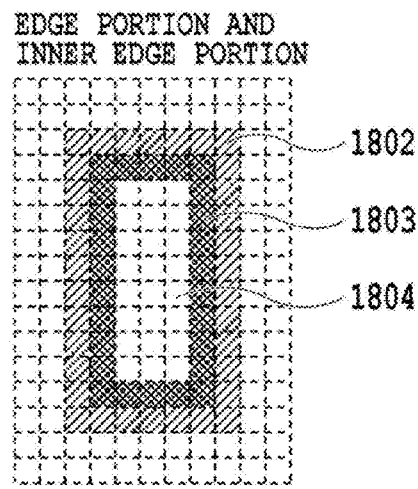

FIG. 18B is a diagram showing edge pixels 1802 whose high-order one bit of the edge information (that is input to the image combination unit 307) is "1" by slashes and inner edge pixels 1803 in contact with the edge pixel by diagonal gratings. For the edge pixels 1802, the edge correction data is used, for the inner edge pixels 1803, the combined data is used, and for pixels 1804 within the inside area of the inner edge pixels 1803, the screen data is used.

Figure 18C:
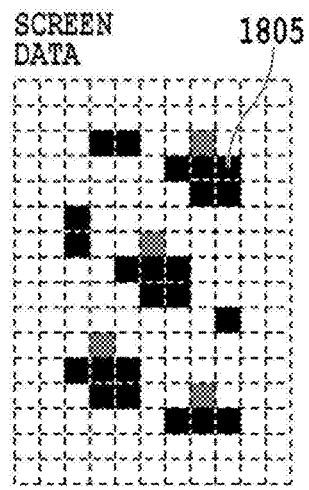

FIG. 18C is a diagram showing screen data that is generated by the screen processing unit 305. A pixel group 1805 is a pixel group consisting of halftone dots converted by halftone processing.

Figure 18D:
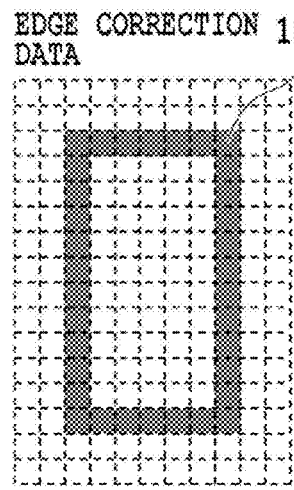

FIG. 18D is a diagram showing edge correction data that is input to the image combination unit 307 and pixel values of pixels represented in gray are the pixel values in the edge pixels 1802 shown in FIG. 18B.

Figure 18E:
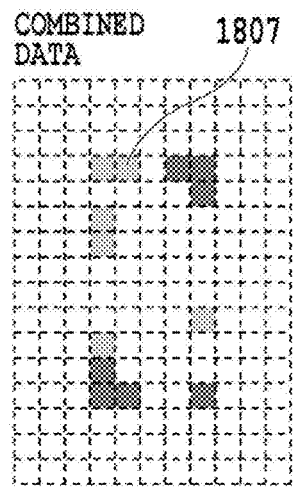

FIG. 18E is a diagram showing combined data that is generated by the image combination unit 307, and the pixel values of pixels represented in gray at a plurality of levels are the pixel values in the inner edge pixels 1803 shown in FIG. 18B.

Figure 18F:
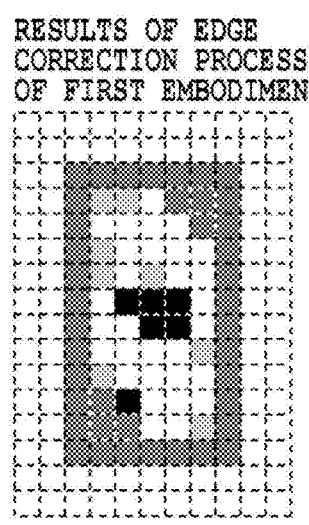

FIG. 18F is a diagram showing output image data as the results of the edge correction processing according to the present embodiment, which is output from the image combination unit 307. In this case, the edge correction data in FIG. 18D is used for the edge pixels 1802, the combined data in FIG. 18E is used for the inner edge pixels 1803, and the screen data in FIG. 18C is used for the pixels 1804 within the inside area of the inner edge pixels, respectively.

FIGS. 19A to 19D are diagrams explaining the amount of exposure of each pixel in the image after the edge correction processing according to the present embodiment.

Figure 19D:
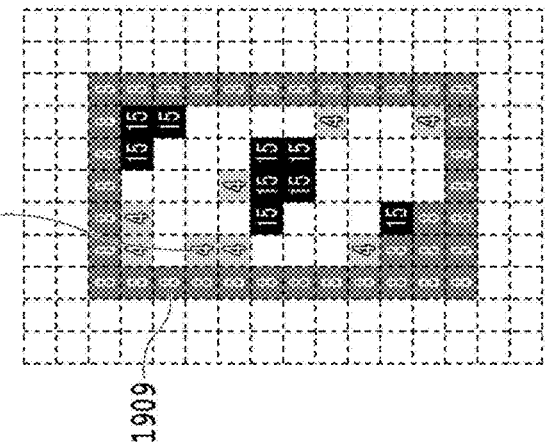
FIGS. 19A to 19D are diagrams explaining an amount of exposure of each pixel in an image after the edge correction processing according to the first embodiment.
Figure 19C:
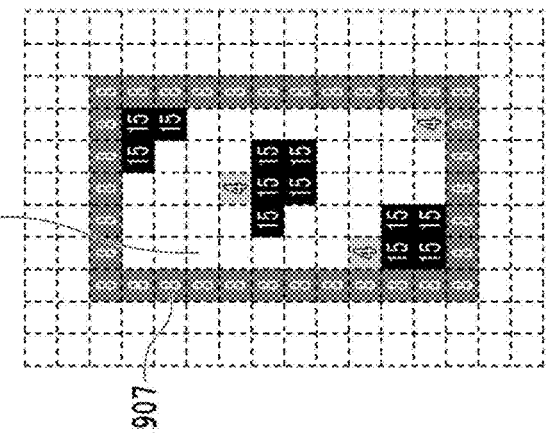
Figure 19A:
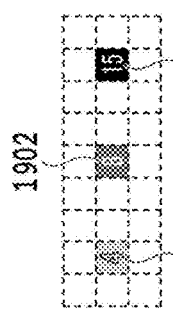

FIG. 19A shows the amount of exposure for the signal value of the pixel. The pixel value of a pixel 1901 is "4" and it is shown that the amount of exposure is small in pale gray. The pixel value of a pixel 1902 is "8" and the amount of exposure is larger than that of the pixel 1901, and the pixel 1902 is represented in somewhat dark gray. The pixel value of a pixel 1903 is "15" and the amount of exposure is larger than that of the pixel 1902, and the pixel 1903 is represented in black.

Figure 19B:
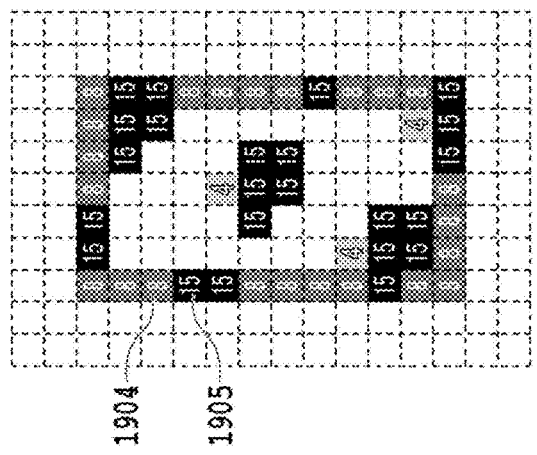

FIG. 19B is a diagram showing the amount of exposure of each pixel in the edge correction processing results (1) according to the prior art shown in FIG. 17E. In FIG. 19B, the pixel values of the edge portion are different for different pixels, and, for example, a difference in level occurs between a pixel 1904 (gray) and a pixel 1905 (black). Further, because of the characteristics of an electrophotograph, a half dot is pulled by a full dot, and therefore, the difference in level becomes more remarkable at the time of latent image formation, and jaggies are not removed perfectly.

FIG. 19C is a diagram showing the amount of exposure of each pixel in the edge correction processing results (2) according to another prior art shown in FIG. 17F. In FIG. 19C, all the pixel values of the edge portion are the same and "8", and therefore, such a problem of the difference in level in the edge portion will not arise. However, the screen dot (full dot) that has been present in the pixel 1905 in FIG. 19B is replaced with the half dot having a pixel value of "8" in FIG. 19C, and therefore, the continuity of the screen dot is lost. For example, the influence of the exposure of a pixel 1907 o a pixel 1908 is lost. In other words, because the full dot that has been present in the edge portion is replaced with the half dot due to the edge correction data, the continuity of the screen dot is lost before the edge, and unnaturalness will result.

As is obvious from FIGS. 19B and 19C, it is known that in the case where the results of the screen processing in which the phase is shifted are not combined on the periphery of the edge portion, jaggies are not removed or a defect occurs in the image.

FIG. 19D is a diagram showing the amount of exposure of each pixel in the edge correction processing results according to the present embodiment shown in FIG. 18F. In FIG. 19D, as in FIG. 19C, the edge portion consists of the same half dots and there is no variation in pixel value, and therefore, the problem of the difference in level (ruggedness) in the edge portion does not arise. Further, by combining the screen results in which the phase is shifted with the pixel (inner edge pixel) adjacent to the edge portion inside the object, the screen dot that has been present in the edge portion is shifted to the inside of the object. For example, by adding a dot to a pixel 1910, it is possible to make a screen dot seem to be present with a pixel 1909 as a center. Due to this, the continuity of the screen dot is also maintained in the edge portion.

According to the present embodiment, the results of the screen processing in which the phase is shifted are combined with the pixel inside the object, which is adjacent to the edge portion, and the screen dot in the edge portion, which has been replaced, is arranged again inside the object. Due to this, it is possible to reduce jaggies in the edge portion while maintaining the continuity of the screen dot as far as the vicinity of the edge portion.

[Second Embodiment]

Next, an aspect is explained as a second embodiment in which a screen dot that is present in the edge portion is moved into the inside of the object in place of combining the screen results in which the phase is shifted with respect to the pixel adjacent to the edge portion inside the object. Explanation of the portions in common to those of the first embodiment is omitted or simplified and in the following, different points are explained mainly.

Figure 20:
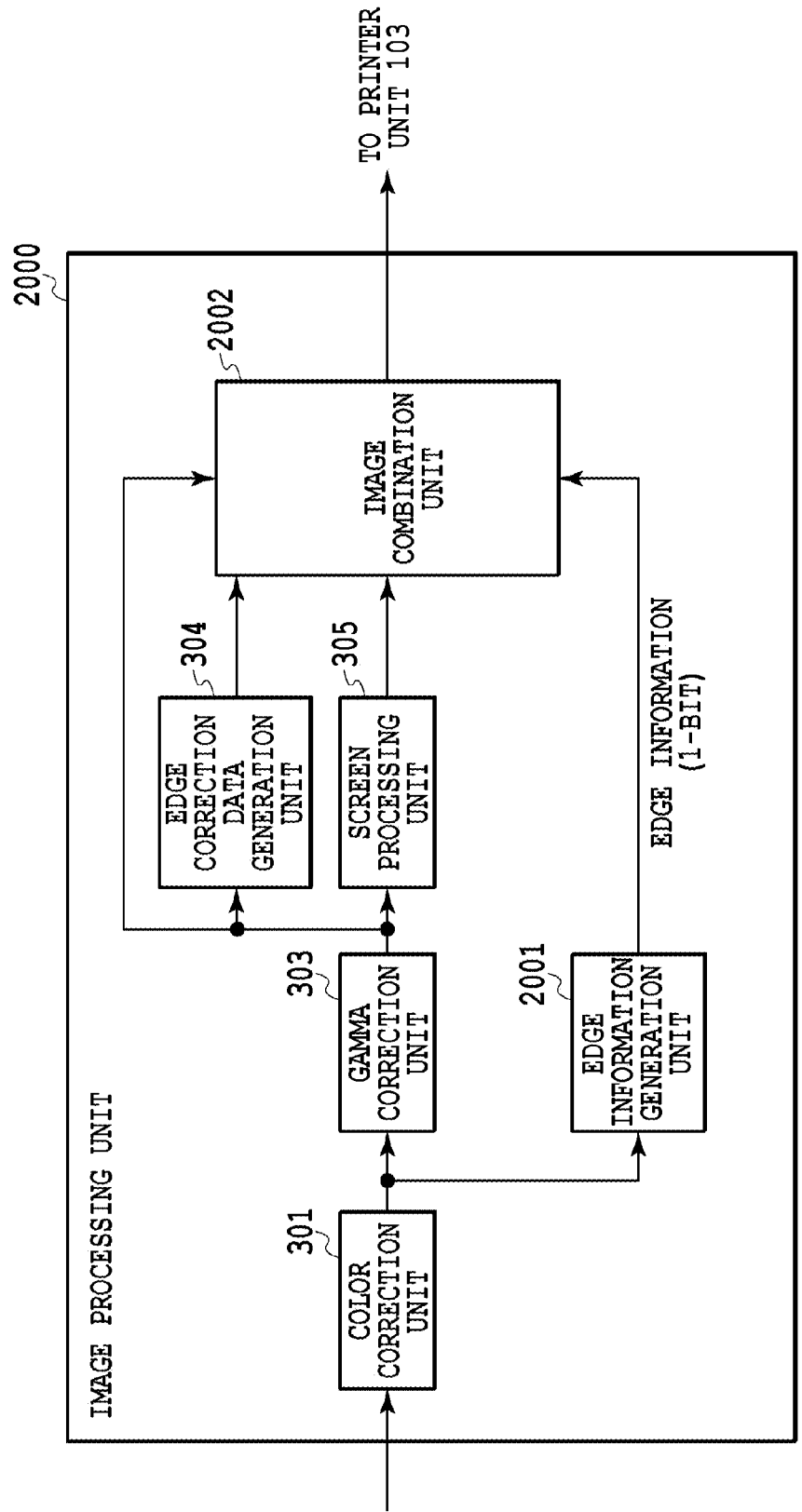
FIG. 20 is a block diagram showing an internal configuration of an image processing unit according to a second embodiment.

FIG. 20 is a block diagram showing an internal configuration of an image processing unit as a function unit configured to perform image processing according to the present embodiment. An image processing unit 2000 according to the present embodiment includes the color correction unit 301, an edge information generation unit 2001, the gamma correction unit 303, the edge correction data generation unit 304, the screen processing unit 305, and an image combination unit 2002. Among these units, the color correction unit 301, the gamma correction unit 303, the edge correction data generation unit 304, and the screen processing unit 305 are the same as those of the first embodiment.

Figure 21:
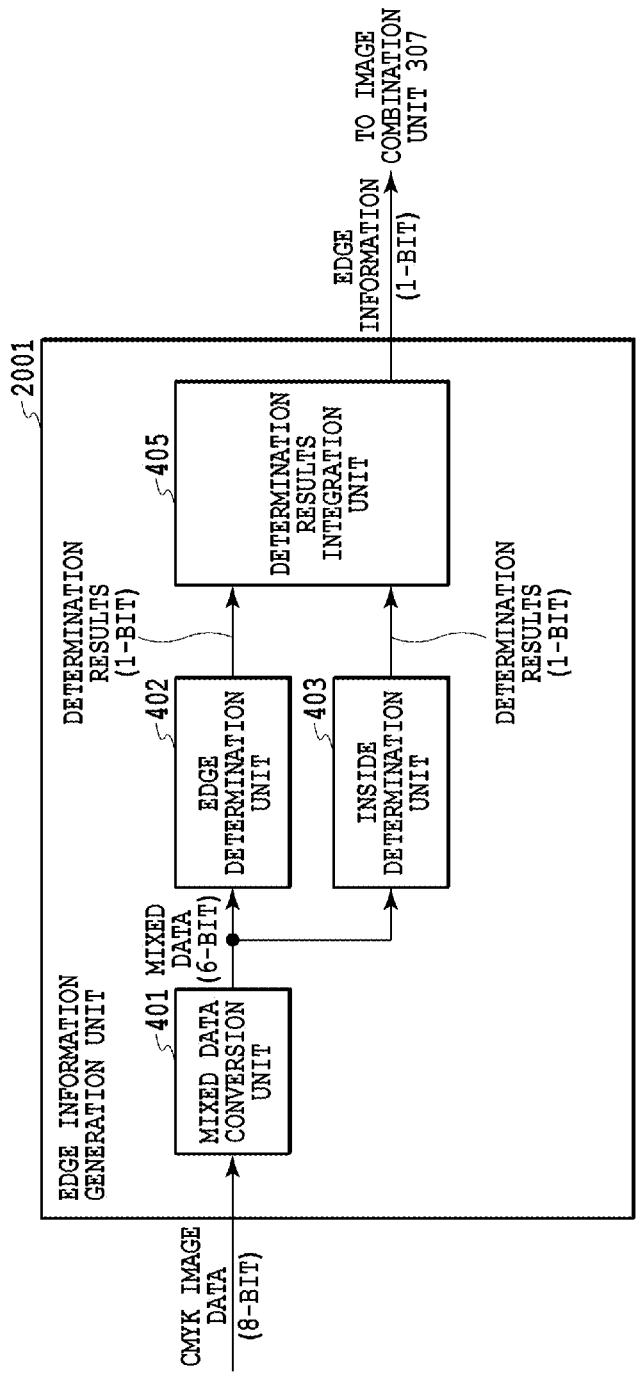
FIG. 21 is a block diagram showing an internal configuration of an edge information generation unit according to the second embodiment.

The edge information generation unit 2001 generates edge information for each color of CMYK. FIG. 21 is a block diagram showing an internal configuration of the edge information generation unit 2001 according to the present embodiment. As compared with FIG. 4 of the first embodiment, it is known that the edge direction determination unit 404 is not present. Because of this, in the edge information in the present embodiment, information indicating the direction of an edge is not included. In other words, the edge information in the present embodiment is information that is data having a 1-bit value for each pixel and which indicates "1" in the case where the pixel is an edge pixel and "0" in the case where the pixel is a non-edge pixel. The generated edge information is referred to at the time of switching processing by the image combination unit 2002.

The image combination unit 2002 performs image combination processing, to be described later, based on the edge information received from the edge information generation unit 2001 and the image data after gamma correction.

<Image Combination Processing>

Figure 22:
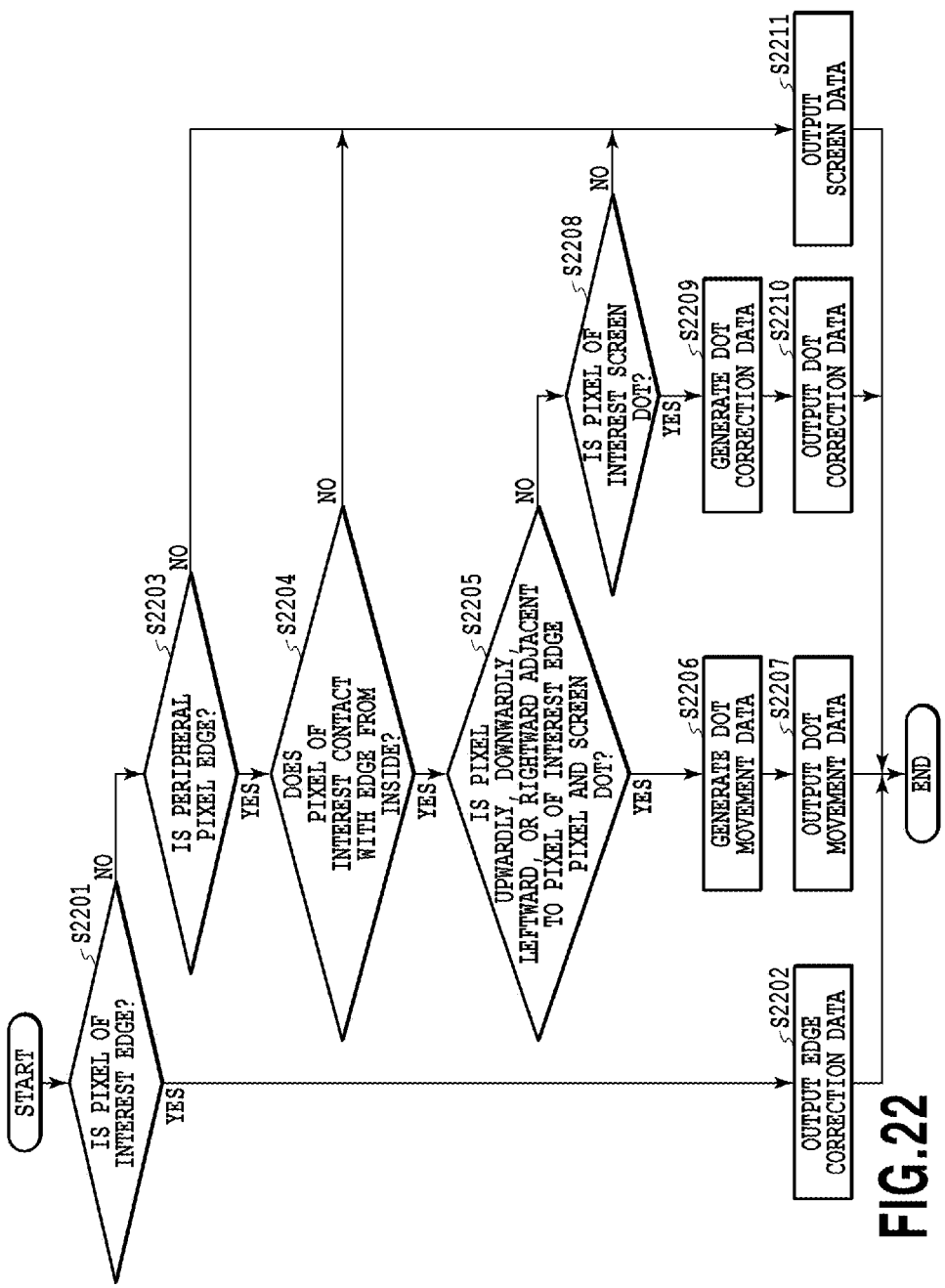
FIG. 22 is a flowchart showing a flow of image combination processing according to the second embodiment.

Next, details of the image combination processing that is performed by the image combination unit 2002 are explained. FIG. 22 is a flowchart showing a flow of the image combination processing that is performed by the image combination unit 2002. FIGS. 23A to 23G are diagrams corresponding to FIGS. 18A to 18F and are diagrams explaining examples of the case where the edge correction processing is performed by using the present embodiment. FIG. 23A shows image data that is input to the screen processing unit 305 and as in FIG. 18A described previously, a rectangular object 2301 of 12 vertical pixels×7 horizontal pixels exists. FIG. 23B is a diagram showing edge pixels 2302 whose edge information (that is input to the image combination unit 2002) is "1" by slashes and inner edge pixels 2303 in contact with the edge pixel by diagonal gratings. FIG. 23C is a diagram showing screen data that is generated by the screen processing unit 305. A pixel group 2304 is a pixel group consisting of halftone dots converted by halftone processing. FIG. 23D is a diagram showing edge correction data that is input to the image combination unit 2002 and pixel values of pixels represented in gray are the pixel values in the edge pixels 2302 shown in FIG. 23B. FIG. 23E is a diagram showing dot movement data that is generated by the image combination unit 2002. FIG. 23F is a diagram showing dot correction data that is generated by the image combination unit 2002. FIG. 23G is a diagram showing output image data as the edge correction processing results according to the present embodiment, which is output from the image combination unit 2002.

At step 2201, the image combination unit 2002 determines whether or not the pixel of interest is an edge pixel based on the edge information that is input from the edge information generation unit 2001. Specifically, in the case where the value of the edge information is "1", it is determined that the pixel of interest is an edge pixel and the processing proceeds to step 2202. On the other hand, in the case where the value of the edge information is "0", it is determined that the pixel of interest is a non-edge pixel and the processing proceeds to step 2203.

At step 2202, the image combination unit 2002 outputs the pixel value of the pixel of interest in the edge correction data that is input from the edge correction data generation unit 304 to the printer unit 103 as output image data.

At step 2203, the image combination unit 2002 determines whether or not an edge pixel exists among the peripheral pixels (eight peripheral pixels surrounding the pixel of interest) of the pixel of interest by referring to the edge information that is input from the edge information generation unit 2001. In the case where an edge pixel exists among the peripheral pixels, the processing proceeds to step 2204. On the other hand, in the case where an edge pixel does not exist among the peripheral pixels, the processing proceeds to step 2211.

At step 2204, the image combination unit 2202 determines whether the pixel of interest is a pixel that contacts with an edge pixel from the inside by comparing the pixel value of the pixel of interest with the pixel value (both pixel values are values after gamma correction) of the reference pixel described previously (whether the pixel of interest is a pixel inside the object). Specifically, determination is performed in accordance with the following conditions (see FIG. 16 described previously).

In the case where the value of the edge information of the reference pixel 1602 is "1", on a condition that the value obtained by subtracting the pixel value of the reference pixel 1606 from the pixel value of the pixel of interest 1601 is greater than "0", it is determined that the pixel of interest is a pixel that contacts with an edge pixel from the inside.

In the case where the value of the edge information of the reference pixel 1603 is "1", on a condition that the value obtained by subtracting the pixel value of the reference pixel 1607 from the pixel value of the pixel of interest 1601 is greater than "0", it is determined that the pixel of interest is a pixel that contacts with an edge pixel from the inside.

In the case where the value of the edge information of the reference pixel 1604 is "1", on a condition that the value obtained by subtracting the pixel value of the reference pixel 1608 from the pixel value of the pixel of interest 1601 is greater than "0", it is determined that the pixel of interest is a pixel that contacts with an edge pixel from the inside.

In the case where the value of the edge information of the reference pixel 1605 is "1", on a condition that the value obtained by subtracting the pixel value of the reference pixel 1608 from the pixel value of the pixel of interest 1601 is greater than "0", it is determined that the pixel of interest is a pixel that contacts with an edge pixel from the inside.

In the case where the above-described four conditions are not met, it is determined that the pixel of interest is not a pixel that contacts with an edge pixel from the inside.

In the case where the results of the determination indicate that the pixel of interest is a pixel that contacts with an edge pixel from the inside, the processing proceeds to step 2205. On the other hand, in the case where it is determined that the pixel of interest is not a pixel that contacts with an edge pixel from the inside, the processing proceeds to step 2211.

At step 2205, the image combination unit 2002 determines whether a pixel upwardly, downwardly, leftward, or rightward adjacent to the pixel of interest is an edge pixel and is a part of the screen dots (whether a pixel constituting the screen dot). Specifically, whether the value of the edge information (1 bit) is "1" and the pixel is a pixel having a value equal to or greater than "1" in the screen data is determined for the pixel upwardly, downwardly, leftward, or rightward adjacent to the pixel of interest. In the case where the results of the determination indicate that the pixel upwardly, downwardly, leftward, or rightward adjacent to the pixel of interest is an edge pixel and a pixel constituting the screen dot (hereinafter, edge dot pixel), the processing proceeds to step 2206. On the other hand, in the case where the pixel upwardly, downwardly, leftward, or rightward adjacent to pixel of interest is not an edge dot pixel, the processing proceeds to step 2208.

At step 2206, the image combination unit 2002 generates dot movement data. Specifically, dot movement data is obtained by subtracting the pixel value in the edge correction data that is input from the edge correction data generation unit 304 from the pixel value in the screen data of the edge dot pixel. In other words, dot movement data [DotShiftVal] is found by expression (1) below from screen data [DotVal] of the edge dot pixel and edge correction data [EdgeVal].

$$\text{DotShiftVal} = \text{DotVal} - \text{EdgeVal} \quad \text{expression (1)}$$

Here, the case where the pixel of interest is a pixel 2305 (one of pixels represented in gray in the dot movement data) in FIG. 23E is specifically explained as an example. A pixel 2306 in FIG. 23A, a pixel 2307 in FIG. 23B, a pixel 2308 in FIG. 23C, and a pixel 2309 in FIG. 23D are corresponding pixels located in the same position as that of the pixel 2305 in FIG. 23E.

First, the pixel of interest is not an edge, and therefore, the processing proceeds to step 2203 (No at step 2201, see the pixel 2307 in FIG. 23B).

Next, as a pixel that is on the periphery of the pixel of interest and which is an edge, there is a pixel 2310 in FIG. 23B, and therefore, the processing proceeds to step 2204 (Yes at step 2203).

Then, the pixel value of the pixel 2306 in FIG. 23A is a value greater than "0", and therefore, it is determined that the pixel 2306 is located inside the edge and the processing proceeds to step 2205 (Yes at step 2204).

Then, the pixel leftward adjacent to the pixel of interest is an edge pixel and is also the screen dot (see the pixel 2310 in FIG. 23B and a pixel 2311 in FIG. 23C), and therefore, the processing proceeds to step 2206 and dot movement data is generated. Here, the pixel value of the pixel 2311 is "15", and therefore, DotVal is "15". Because the pixel value of a pixel 2312 is "8" (see FIG. 23D), the edge correction data [EdgeVal] is "8". Consequently, the dot movement data [DotShiftVal] is "7", which is obtained by subtracting "8" from "15".

In this manner, the dot movement data is generated. Alternatively, it may also be possible to obtain the dot movement data by referring to the screen data on the periphery of the pixel of interest and by determining a pixel value in accordance with the distance from the peripheral screen dot up to the pixel of interest.

Explanation is returned to the flowchart in FIG. 22.

At step 2207, the image combination unit 2002 outputs the dot movement data that is generated with respect to the pixel of interest to the printer unit 103 as output image data.

At step 2208, the image combination unit 2002 determines whether the pixel of interest is a part of the screen dots. Specifically, the image combination unit 2002 determines whether the pixel of interest is a pixel (pixel constituting the screen dot) having a value equal to or greater than "1" in the screen data that is input from the screen processing unit 305. In the case where the results of the determination indicate that the pixel of interest is a pixel constituting the screen dot, the processing proceeds to step 2209. On the other hand, in the case where the pixel of interest is not a pixel constituting the screen dot, the processing proceeds to step 2211.

At step 2209, the image combination unit 2002 generates dot correction data. Dot correction data [DotFixVal] is found from a sum value [DotSum] of the screen data in a predetermined area (e.g., 3×3 pixels) including the pixel of interest, a sum value [EdgeSum] of the edge correction data in the predetermined area, and a number [DotNum] of pixels to which the dot correction data within the predetermined area is applied by using expression (2) below (the fractional part is rounded down).

$$\text{DotFixVal} = (\text{DotSum} - \text{EdgeSum})/\text{DotNum} \quad \text{expression (2)}$$

Here, the case is explained where the pixel of interest is a pixel 2313 in FIG. 23F (one of pixels represented in gray in the dot correction data). A pixel 2314 in FIG. 23A, a pixel 2315 in FIG. 23B, and a pixel 2316 in FIG. 23C are corresponding pixels located in the same position as that of the pixel 2313 in FIG. 23F.

First, the pixel of interest is not an edge, and therefore, the processing proceeds to step 2203 (No at step 2201, see the pixel 2315 in FIG. 23B).

Next, as a pixel that is on the periphery of the pixel of interest and which is an edge, there is a pixel 2317 in FIG. 23B, and therefore, the processing proceeds to step 2204 (Yes at step 2203).

Then, the pixel value of the pixel 2313 in FIG. 23F is a value greater than "0", and therefore, it is determined that the pixel 2313 is located inside the edge and the processing proceeds to step 2205 (Yes at step 2204).

Then, a pixel that is an edge pixel and which constitutes the screen dot does not exist among the pixels upwardly, downwardly, leftward, and rightward adjacent to the pixel of interest, and therefore, processing proceeds to step 2208 (No at step 2205).

Then, the pixel of interest constitutes the screen dot (see the pixel 2316 in FIG. 23C), and therefore, the processing proceeds to step 2209 and the dot correction data is generated. Here, the sum value [DotSum] of the screen data of the 3×3 pixels in the case where the pixel 2313 (=the pixel 2316) is taken to be the pixel of interest is "53" because there are three pixels whose pixel value is "15" and there is one pixel whose pixel value is "8". Similarly, the sum value [EdgeSum] of the edge correction data within the above-described 3×3 pixels is "24" because there are three pixels whose pixel value is "8". Further, the number [DotNum] of pixels (pixels other than pixels whose pixel value is 0 within 3×3 pixels and which do not constitute an edge) within the above-described 3×3 pixels, to which the dot correction data is applied, is three (see FIG. 23F). Consequently, the dot correction data [DotFixVal] in this case is (53−24)/3=9.66 10.

The reason the "difference between the sum value of the screen data within the predetermined area including the pixel of interest and the sum value of the edge correction data within the predetermined area" is divided by the "number of pixels to which the dot correction data within the predetermined area is applied" is for preserving the density in the 3×3 pixels with the pixel of interest as a center. Originally, the screen data in FIG. 23C is in the state where the density is preserved for the input image in FIG. 23A. However, the edge correction data in FIG. 23E is added to the edge portion, and therefore, the density increases. The edge portion after the image combination processing consists of the edge correction data and the dot correction data, and therefore, by subtracting the edge correction data from the results of the screen data whose density is preserved, it is made possible to calculate the dot correction data. In the present embodiment, the predetermined area is the area of 3×3 pixels, but an area of 5×5 pixels or 7×7 pixels may be accepted.

At step 2210, the image combination unit 2002 outputs the dot correction data that is generated with respect to the pixel of interest to the printer unit 103 as output image data.

At step 2211, the image combination unit 2102 outputs the pixel value of the pixel of interest in the screen data [Sc], which is the output results of the screen processing unit 305, to the printer unit 103 as output image data.

The above-described processing is repeated until there is no longer a pixel on which the processing has not been performed yet within the input image data. The above is the contents of the image combination processing according to the present embodiment.

The method for generating dot movement data or dot correction data is not limited to the method described above. For example, it may also be possible to generate dot movement data or dot correction data by using an LUT prepared in advance in which the pixel value after the gamma correction of the pixel of interest is taken to be the input value and the value of dot movement data or dot correction data corresponding to each input value is taken to be the output value.

<Modification Example>

In the case of an object in which edges cluster together, such as a character in a small point size, generating dot movement data by using the above-described method will cause deterioration of an image because a difference in density occurs between the portion in which edges cluster together and the portion located on the periphery thereof and in which edges do not cluster together. Consequently, based on the second embodiment described above, an aspect is explained as a modification example in which dot movement data is generated by also taking into consideration the number of edge pixels on the periphery of the pixel of interest.

The difference from the second embodiment lies only in the contents of the dot movement data generation processing at step 2206, and therefore, in the following, only the method for generating dot movement data in the present modification example is explained.

Figure 24:
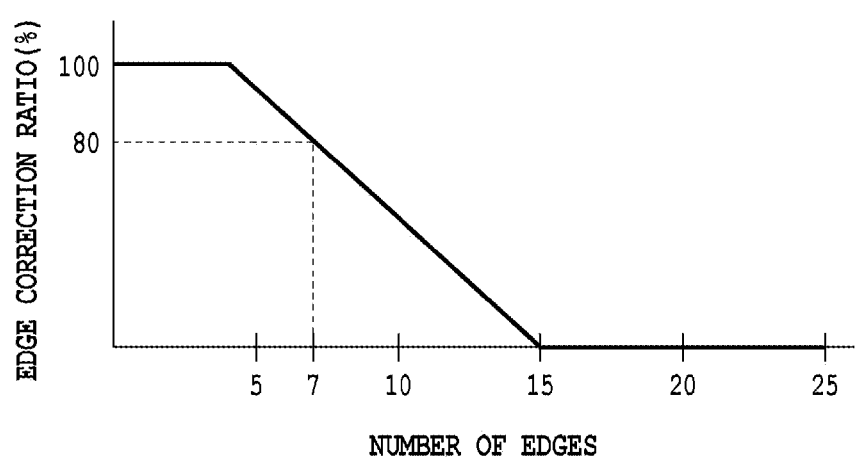
FIG. 24 is a diagram showing an example of characteristics of a correction ratio table in the case where a predetermined peripheral area is an area of 5×5 pixels.

At step 2206, the image combination unit 2002 obtains dot movement data by subtracting the pixel value in the edge correction data from the pixel value of the screen data of the edge dot pixel and multiplying the value obtained by the subtraction by a predetermined edge correction ratio. Here, the edge correction ratio is a value that is determined by the number of edge pixels within a predetermined peripheral area (e.g., an area of 5×5 pixels) of the pixel of interest, and for example, is determined by a one-dimensional LUT (correction ratio table). FIG. 24 is a diagram showing an example of the characteristics of a correction ratio table in the case where the predetermined peripheral area is an area of 5×5 pixels. In the correction ratio table having the characteristics shown in FIG. 14A to 14F, for example, in the case where there are seven edge pixels on the periphery of the pixel of interest, the edge correction ratio is 80% and it is known that the edge correction ratio becomes smaller as the number of edge pixels increases. In other words, in the present modification example, the more there are edges on the periphery of the pixel of interest, the smaller the value of the dot movement data that is generated becomes. Due to this, it is possible to suppress a large difference in density from occurring between the portion in which edges cluster together and the periphery thereof.

FIGS. 25A to 25G are diagrams showing the results of the edge correction processing in the present embodiment (including the modification example).

Figure 25A:
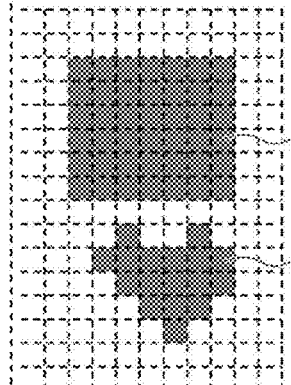
FIGS. 25A to 25G are diagrams showing examples of results of the edge correction processing in the second embodiment.

FIG. 25A shows image data that is input to the screen processing unit 305 and shows that an object 2501 in the shape of a rectangle of 6 vertical pixels×7 horizontal pixels and an object 2502 one size smaller than the object 2501 and having an irregular shape exist in positions in proximity to each other. The density of the object 2501 is the same as the density of the object 2502.

Figure 25B:
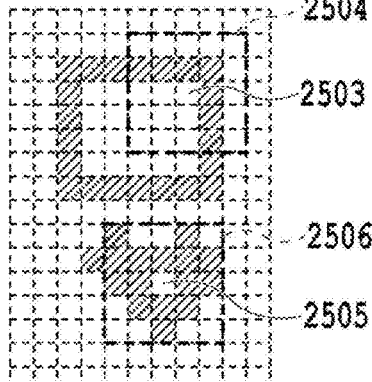

FIG. 25B is a diagram in which edge pixels whose value of edge information is "1" are represented by slashes. In FIG. 25B, a rectangle 2504 indicated by a broken line represents a peripheral area (area of 5×5 pixels) in the case where a pixel 2503 is taken to be the pixel of interest. In this case, the number of edge pixels is seven. Further, a rectangle 2506 indicated by a broken line represents a peripheral area (area of 5×5 pixels) in the case where a pixel 2505 is taken to be the pixel of interest. In this case, the number of edge pixels is 15.

Figure 25C:
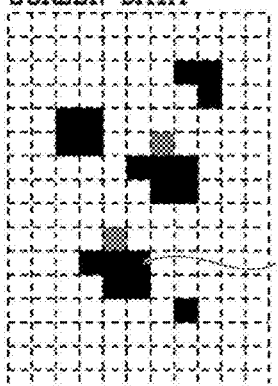

FIG. 25C is a diagram showing screen data that is generated by the screen processing unit 305. A pixel group 2507 is a pixel group consisting of halftone dots converted by halftone processing.

Figure 25D:
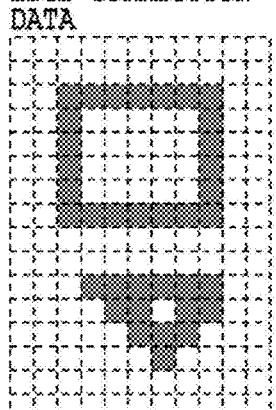

FIG. 25D is a diagram showing edge correction data that is input to the image combination unit 2002 and the pixel values are those in the edge pixels represented by slashes in FIG. 25B.

Figure 25E:
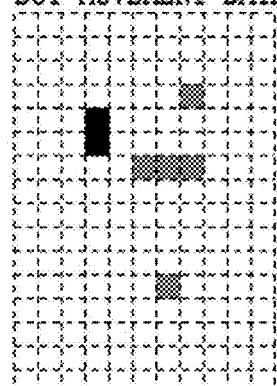

FIG. 25E is a diagram showing dot movement data that is input to the image combination unit 2002.

Figure 25F:
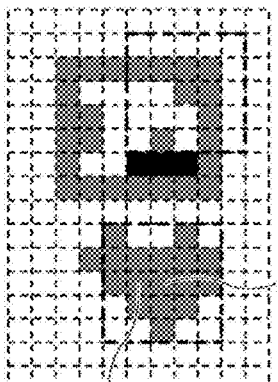

FIG. 25F is a diagram showing an example of the edge correction processing results in the case where the second embodiment is applied. A pixel 2508 is an edge pixel constituting an edge and there exists a screen dot, and therefore, a dot is added to a pixel 2509 by the image combination processing.

Figure 25G:
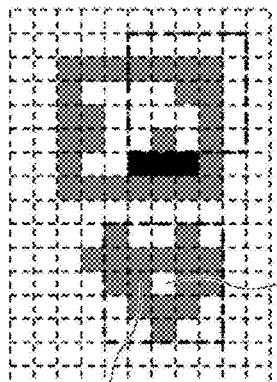

FIG. 25G is a diagram showing an example of the edge correction processing results in the case where the modification example is applied. A pixel 2510 is an edge pixel constituting an edge and is a screen dot. As to a pixel 2511 to which a dot is to be added in the second embodiment, the number of edge pixels within the peripheral area in the case where the pixel 2511 is taken to be the pixel of interest is 15, and therefore, the edge correction ratio is 0% (see the correction ratio table in FIG. 24) and the pixel value is "0 (white pixel)" as a result.

In the case where FIG. 25F and FIG. 25G are compared, the density of the whole of the object 2502 is higher in FIG. 25F than in FIG. 25G. As a result of this, a difference in density between the two objects 2501 and 2502 that should be represented in the same density originally becomes large in FIG. 25F, but it is smaller in FIG. 25G because the pixel 2511 is a white pixel.

As described above, by generating the dot movement data in accordance with the number of edge pixels, it is also possible to implement edge correction processing without causing deterioration of an image even in the case where edges cluster together.

Further, as to the edge correction data and the dot correction data, it may also be possible to generate them in accordance with the number of edge pixels as in the case of the dot movement data.

As described above, according to the present embodiment, by moving the screen dot into the inside of an object, it is possible to reduce jaggies in the edge portion while keeping continuity of the screen dot as far as the vicinity of the edge portion. Further, the shifted-phase screen processing is not performed, and therefore, it is not necessary to hold a circuit for this and it is possible to implement the present embodiment at a lower cost compared to the first embodiment.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce jaggies in the edge portion while keeping deterioration of an image to a minimum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167978, filed Aug. 20, 2014, which is hereby incorporated by reference wherein in its entirety.

What is claimed is:

1. An image processing apparatus comprising:
a controlling portion having a processor which executes instructions stored in a memory or having a circuitry, the controlling portion being configured to:
determine an edge of an object from input image data;
generate edge correction data used to correct a pixel value of a pixel constituting the edge;
generate screen data by performing screen processing on the input image data; and
generate output image data in which a screen dot existing in the edge in the screen data is shifted into the inside of the object.

2. The image processing apparatus according to claim 1, wherein
the screen data generation comprises:
generating first screen data by performing first screen processing on the input image data; and
generating second screen data in which the phase is shifted with respect to the first screen data by performing second screen processing on the input image data, wherein
output image data is generated in which the screen dot existing in the edge in the first screen data is shifted into the inside of the object by using the first screen data and the second screen data.

3. The image processing apparatus according to claim 2, wherein
the output image data is generated by using the edge correction data for a pixel constituting the edge and by using combined data obtained by combining the first screen data and the second screen data for a pixel that is adjacent to the edge and which is located inside the object.

4. The image processing apparatus according to claim 3, wherein the controlling portion is further configured to generate information indicating a direction of the edge, wherein
the combined data is generated by combining the second screen data in which the phase is shifted in the direction opposite to the direction of the edge based on the information indicating the direction of the edge with the first screen data.

5. The image processing apparatus according to claim 4, wherein
the combined data is obtained by multiplying a value, which is obtained by adding the pixel value of a pixel of interest in the first screen data to the pixel value of a pixel of interest in the second screen data, by a predetermined coefficient.

6. The image processing apparatus according to claim 2, wherein
the second screen processing performs screen processing by using a dither matrix that has been used by the first screen processing and in which the phase is shifted.

7. The image processing apparatus according to claim 6, wherein
the dither matrix in which the phase is shifted is the dither matrix that has been used by the first screen processing and in which the phase is shifted upwardly, downwardly, leftward, or rightward by one cell.

8. The image processing apparatus according to claim 1, wherein,
in a case where a pixel of interest is a pixel that contact with the edge from the inside, output image data is generated in which a screen dot existing in the edge in the screen data is shifted into the inside of the object by:
taking, on a condition that a pixel adjacent to the pixel of interest is a pixel constituting the edge and on a condition that the pixel is a pixel constituting the screen dot in the screen data, a value obtained by multiplying a first value, which is obtained by subtracting the pixel value in the edge correction data from the pixel value in the screen data of the adjacent pixel, by a predetermined correction ratio to be the pixel value of the pixel of interest; and
taking, on a condition that the pixel of interest is a pixel constituting the screen dot, a second value obtained by dividing a difference between the sum value of the screen data within a predetermined area including the pixel of interest and the sum value of the edge correction data within the predetermined area by the number of pixels other than pixels within the predetermined area whose pixel value is 0 and which do not constitute the edge to be the pixel value of the pixel of interest.

9. The image processing apparatus according to claim 8, wherein
the predetermined correction ratio is determined by the number of edge pixels located within a predetermined peripheral area of the pixel of interest.

10. The image processing apparatus according to claim 1, wherein,
in a case where a pixel of interest is a pixel that contacts with the edge from the inside, output image data is generated in which the screen dot existing in the edge in the screen data is shifted into the inside of the object by:
taking, on a condition that a pixel adjacent to the pixel of interest is a pixel constituting the edge and on a condition that the pixel is a pixel constituting the screen dot in the screen data, a first value obtained by subtracting the pixel value in the edge correction data from the pixel value in the screen data of the adjacent pixel to be the pixel value of the pixel of interest; and
taking, on a condition that the pixel of interest is a pixel constituting the screen dot, a second value obtained by dividing a difference between the sum value of the screen data within a predetermined area including the pixel of interest and the sum value of the edge correction data within the predetermined area by the number of pixels other than pixels within the predetermined area whose pixel value is 0 and which do not constitute the edge to be the pixel value of the pixel of interest.

11. The image processing apparatus according to claim 10, wherein
the image combination generates the output image data by referring to a lookup table in which the pixel value of the pixel of interest is taken to be an input value and the first value and the second value are taken to be output values.

12. An image processing apparatus comprising:
a controller having a processor which executes instructions stored in a memory or having a circuitry, the controller being configured to:
detect an edge portion of an object in first image data to generate edge information corresponding to a pixel of the first image data;
perform dither processing using a dither matrix for the first image data to generate second image data; and
with respect to a pixel on the edge portion of the object in the first image data, perform outputting edge correction data based on a value of the pixel; and
with respect to a neighboring area of the edge portion, the neighboring area is included in the object in the first image data,
in a case where a value of a pixel in the second image data corresponding to the pixel of the neighboring area is not 0, perform outputting data obtained by using a value of the pixel of the neighboring area in the first image data and a first correction property, and
in a case where a value of pixel in the second image data corresponding to the pixel of the neighboring area is 0 and a value of a neighboring pixel of the pixel in the second image data is not 0 and edge information corresponding to the neighboring pixel indicates the edge portion, perform outputting data obtained by using a value of the pixel of the neighboring area in the first image data and a second correction property.

13. The image processing apparatus according to claim 12, wherein the controller is further configured to, in a case where a value of a pixel in the second image data corresponding to the pixel of the neighboring area is 0 and a value of a neighboring pixel of the pixel in the second image data is 0, and edge information corresponding to the neighboring pixel indicates edge portion, perform outputting value of the pixel in the second image data corresponding to the pixel of the neighboring area.

14. An image processing method comprising:
detecting an edge portion of an object in first image data to generate edge information corresponding to a pixel of the first image data; and
performing dither processing using a dither matrix for the first image data to generate second image data; and
with respect to a pixel on the edge portion of the object in the first image data, perform outputting edge correction data based on a value of the pixel; and
with respect to a neighboring area of the edge portion, the neighboring area is included in the object in the first image data,
in a case where a value of a pixel in the second image data corresponding to the pixel of the neighboring area is not 0, performing outputting data obtained by using a value of the pixel of the neighboring area in the first image data and a first correction property, and
in a case where a value of a pixel in the second image data corresponding to the pixel of the neighboring area is 0 and a value of a neighboring pixel of the pixel in the second image data is not 0 and edge information corresponding to the neighboring pixel indicates the edge portion, performing outputting data obtained by using a value of the pixel of the neighboring area in the first image data and a second correction property.

15. The image processing method, according to claim 14, wherein in a case where a value of a pixel in the second image data corresponding to the pixel of the neighboring area is 0 and a value of a neighboring pixel of the pixel in the second image data is 0, and edge information corresponding to the neighboring pixel indicates an edge portion, there is an output of a value of the pixel in the second image data corresponding to the pixel of the neighboring area.

16. A non-transitory-computer readable storage medium for storing a computer program for causing an image processing apparatus to execute:
   detecting an edge portion of an object in first image data to generate edge information corresponding to a pixel of the first image data;
   performing dither processing using a dither matrix for the first image data to generate second image data; and
   with respect to a pixel on the edge portion of the object in the first image data, perform outputting edge correction data based on a value of the pixel; and
   with respect to a neighboring area of the edge portion, the neighboring area is included in the object in the first image data,
   in a case where a value of a pixel in the second image data corresponding to the pixel of the neighboring area is not 0, performing outputting data obtained by using value of the pixel of the neighboring area in the first image data and a first correction property, and
   in a case where a value of a pixel in the second image data corresponding to the pixel of the neighboring area is 0 and a value of a neighboring pixel of the pixel in the second image data is not 0 and edge information corresponding to the neighboring pixel indicates the edge portion, performing outputting data obtained by using a value of the pixel of the neighboring area in the first image data and a second correction property.

17. An image processing apparatus comprising:
   a controller having a processor which executes instructions stored in a memory or having a circuitry, the controlling portion being configured to:
   detect an edge portion of an object in first image data to generate edge information corresponding to a pixel of the first image data; and
   perform dither processing using a dither matrix for the first image data to generate second image data; and
   with respect to a pixel on the edge portion of the object in the first image data, perform outputting edge correction data based on a value of the pixel; and
   with respect to a neighboring area of the edge portion, the neighboring area is included in the object in the first image data,
   in a case where a value of a pixel in the second image data corresponding to the pixel of the neighboring area is a pixel constituting a dot, perform outputting data obtained by using a value of the pixel of the neighboring area in the first image data and a first correction property, and
   in a case where a pixel in the second image data corresponding to the pixel of the neighboring area is a pixel not constituting a dot and a value of a neighboring pixel of the pixel in the second image data is a pixel constituting a dot and edge information corresponding to the neighboring pixel indicates the edge portion, perform outputting data obtained by using a value of the pixel of the neighboring area in the first image data and a second correction property.

18. An image processing method comprising:
   detecting an edge portion of an object in first image data to generate edge information corresponding to a pixel of the first image data;
   performing dither processing using a dither matrix for the first image data to generate second image data; and
   with respect to a pixel on the edge portion of the object in the first image data, perform outputting edge correction data based on value of the pixel; and
   with respect to a neighboring area of the edge portion, the neighboring area is included in the object in the first image data,
   in a case where value of a pixel in the second image data corresponding to the pixel of the neighboring area is a pixel constituting a dot, performing outputting data obtained by using a value of the pixel of the neighboring area in the first image data and a first correction property, and
   in a case where a pixel in the second image data corresponding to the pixel of the neighboring area is a pixel not constituting a dot and a value of a neighboring pixel of the pixel in the second image data is a pixel constituting a dot and edge information corresponding to the neighboring pixel indicates the edge portion, performing outputting data obtained by using a value of the pixel of the neighboring area in the first image data and a second correction property.

19. A non-transitory-computer readable storage medium for storing a computer program for causing an image processing apparatus to execute:
   detecting an edge portion of an object in first image data to generate edge information corresponding to a pixel of the first image data;
   performing dither processing using a dither matrix for the first image data to generate second image data; and
   with respect to a pixel on the edge portion of the object in the first image data, perform outputting edge correction data based on value of the pixel; and
   with respect to a neighboring area of the edge portion, the neighboring area is included in the object in the first image data,
   in a case where a value of a pixel in the second image data corresponding to the pixel of the neighboring area is a pixel constituting a dot, performing outputting data obtained by using a value of the pixel of the neighboring area in the first image data and a first correction property, and
   in a case where a pixel in the second image data corresponding to the pixel of the neighboring area is a pixel not constituting a dot and a value of a neighboring pixel of the pixel in the second image data is a pixel constituting a dot and edge information corresponding to the neighboring pixel indicates the edge portion, performing outputting data obtained by using a value of the pixel of the neighboring area in the first image data and a second correction property.

* * * * *